(12) United States Patent
Ishihara

(10) Patent No.: US 10,411,237 B2
(45) Date of Patent: Sep. 10, 2019

(54) MULTILAYER, MICROPOROUS POLYOLEFIN MEMBRANE, AND PRODUCTION METHOD THEREOF

(71) Applicant: TORAY INDUSTRIES, INC., Tokyo (JP)

(72) Inventor: Takeshi Ishihara, Nasushiobara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 679 days.

(21) Appl. No.: 14/893,021

(22) PCT Filed: May 29, 2014

(86) PCT No.: PCT/JP2014/064246
§ 371 (c)(1),
(2) Date: Nov. 20, 2015

(87) PCT Pub. No.: WO2014/192860
PCT Pub. Date: Dec. 4, 2014

(65) Prior Publication Data
US 2016/0118639 A1     Apr. 28, 2016

(30) Foreign Application Priority Data

May 31, 2013  (JP) .................... 2013-114999

(51) Int. Cl.
| | |
|---|---|
| *H01M 2/16* | (2006.01) |
| *H01M 2/14* | (2006.01) |
| *B29C 47/00* | (2006.01) |
| *B01D 71/26* | (2006.01) |
| *B29C 48/08* | (2019.01) |

(Continued)

(52) U.S. Cl.
CPC ...... *H01M 2/1686* (2013.01); *B01D 67/0027* (2013.01); *B01D 69/02* (2013.01); *B01D 69/12* (2013.01); *B01D 71/26* (2013.01); *B29C 48/08* (2019.02); *B32B 27/08* (2013.01); *B32B 27/32* (2013.01); *H01M 2/145* (2013.01); *H01M 2/1653* (2013.01); *B01D 2325/34* (2013.01); *B29K 2023/0675* (2013.01); *B29K 2023/12* (2013.01); *B32B 2250/03* (2013.01); *B32B 2307/516* (2013.01); *B32B 2307/718* (2013.01)

(58) Field of Classification Search
None
See application file for complete search history.

(56) References Cited

U.S. PATENT DOCUMENTS

2015/0005405 A1* 1/2015 Ishihara .............. H01M 2/1653
521/134

FOREIGN PATENT DOCUMENTS

| | | |
|---|---|---|
| EP | 1905586 A1 | 4/2008 |
| JP | 2132327 B | 5/1990 |

(Continued)

*Primary Examiner* — Catherine S Branch
(74) *Attorney, Agent, or Firm* — Kilpatrick Townsend & Stockton LLP

(57) ABSTRACT

Provided is a microporous polyolefin membrane which has excellent oxidation resistance and electrolyte injection performance and further has excellent permeability and strength balance. The multilayer, microporous polyolefin membrane has a first microporous layer containing polypropylene. The electrolyte injection performance is 20 seconds or less, at least one surface layer is the first microporous layer, and the PP distribution in the first microporous layer is uniform in the in-plane direction.

21 Claims, 4 Drawing Sheets

(51) Int. Cl.
*B32B 27/32* (2006.01)
*B32B 27/08* (2006.01)
*B01D 69/02* (2006.01)
*B01D 67/00* (2006.01)
*B01D 69/12* (2006.01)
*B29K 23/00* (2006.01)

(56) References Cited

FOREIGN PATENT DOCUMENTS

| | | | |
|---|---|---|---|
| JP | 3347835 A | 8/1993 | |
| JP | H11-269290 A | 10/1999 | |
| JP | 2002-105235 A | 4/2002 | |
| JP | 2002-256099 A | 9/2002 | |
| JP | 2003-183432 A | 7/2003 | |
| JP | 2004-152614 A | 5/2004 | |
| JP | 2011-111484 A | 6/2011 | |
| WO | 2006-137540 A1 | 12/2006 | |
| WO | 2007-052663 A1 | 5/2007 | |
| WO | 2007/094530 A1 | 8/2007 | |
| WO | 2008016174 A1 | 2/2008 | |
| WO | 2013/054930 A1 | 4/2013 | |
| WO | WO-2013099607 A1 * | 7/2013 | .......... H01M 2/1653 |

\* cited by examiner

MULTILAYER, MICROPOROUS POLYOLEFIN MEMBRANE, AND PRODUCTION METHOD THEREOF

This application is a United States National Phase Application of co-pending International Patent Application Number PCT/JP2014/064246, filed May 29, 2014 and entitled "MULTILAYER, MICROPOROUS POLYOLEFIN MEMBRANE, AND PRODUCTION METHOD THEREOF", which Application claims priority to Japanese Patent Application Number 2013-114999, filed with the Japanese Patent Office on May 31, 2013, the contents of which are incorporated herein by reference in their entirety.

TECHNICAL FIELD

The present invention relates to a multilayer, microporous polyolefin membrane and a production method thereof, and particularly relates to a multilayer, microporous polyolefin membrane that is useful as a separator for batteries and a production method thereof.

BACKGROUND ART

Multilayer, microporous polyolefin membranes have been used in various applications such as separators for batteries, separators for electrolytic capacitors, various filters, moisture-permeable waterproof clothing, reverse osmosis filter membranes, ultrafiltration membranes, and microfiltration membranes. When a multilayer, microporous polyolefin membrane is used as a separator for a battery, in particular as a separator for a lithium ion battery, the performance thereof is closely related to characteristics, productivity, and safety of the battery. Therefore, excellent permeability, mechanical properties, heat shrinkage resistance, shutdown characteristics, melt down characteristics, and the like are required. For example, if a separator for a battery, the separator having low mechanical strength, is used, the voltage of the battery may be lowered due to a short circuit of electrodes. Furthermore, since it is known that the battery performance of a lithium ion battery is deteriorated when the lithium ion battery is repeatedly charged in the state that it is almost fully charged. Since oxidative deterioration of the separator can be a part of the cause, improvement in separators has been demanded.

As the methods for improving the physical properties of microporous polyolefin membrane, improvements in raw material compositions, stretching conditions, heat treatment conditions, and the like have been investigated and, as a method of enhancing heat resistance, blending of polypropylene has been proposed (e.g. Japanese Unexamined Patent Application Publication No. 2002-105235 and Japanese Unexamined Patent Application Publication No. 2003-183432). In particular, characteristics related to battery productivity, such as electrolyte injection performance, and characteristics related to battery life, such as oxidation resistance, are regarded as important recently in addition to permeability, mechanical properties, heat shrinkage resistance, and the like.

PRIOR ART DOCUMENTS

Patent Documents

For example, Patent Document 1 (Japanese Unexamined Patent Application Publication No. H11-269290) discloses a microporous polyolefin membrane having microscopic unevenness on a surface of the microporous polyolefin membrane by adding a particular amount of polypropylene to ultra high molecular weight polyethylene or a composition thereof. This improved formability as well as excellent permeability and mechanical strength, and provided the microporous polyolefin membrane having enhanced retention and permeability of electrolytic solution. Furthermore, Patent Document 2 (Japanese Unexamined Patent Application Publication No. 2011-111484) discloses a multilayer, microporous polyolefin membrane as a multilayer, microporous polyolefin membrane suitable as a separator that can achieve both oxidation resistance and cycle characteristics. The multilayer, microporous polyolefin membrane contains from 5 to 50% by weight of polypropylene component and from 50 to 95% by weight of polyethylene component, where the polyethylene component contains ultra high molecular weight polyethylene, the temperature difference of the melting point Tme of the polyethylene component and the melting point Tmp of the polypropylene component is within $-20°$ C.$<$Tmp$-$Tme$<23°$ C., and the bubble point is from 400 to 600 kPa.

Patent Document 3 (Japanese Unexamined Patent Application Publication No. 2004-152614) discloses that, when a membrane is formed by adding and blending a particular polyolefin, such as polypropylene, into polyethylene, the content of the polyethylene in the proximity of the surface may be decreased due to segregation of the polyolefin in the surface. Patent Document 3 also discloses that a microporous membrane having such a surface can suppress generation of gas during storage at a high temperature and lowering of discharge capacity. This microporous membrane is a monolayer containing 50% by weight or greater of polyethylene, and is characterized by that the content of polyethylene in the proximity of the surface of at least one face of the membrane is less than the average value of that of the entire membrane, and polypropylene having the viscosity average molecular weight of 200,000 or greater and low molecular weight polypropylene having the viscosity average molecular weight of 50,000 or less are contained at respective amounts of 5 to 20% by weight of the entire amount of raw materials constituting the membrane.

Patent Document 1: Japanese Unexamined Patent Application Publication No. H11-269290
Patent Document 2: Japanese Unexamined Patent Application Publication No. 2011-111484
Patent Document 3: Japanese Unexamined Patent Application Publication No. 2004-152614

SUMMARY OF THE INVENTION

Problems to be Solved by the Invention

To improve oxidation resistance by adding polypropylene, fairly large amount of polypropylene needs to be added; however, when the content of the polypropylene is increased, permeability and strength balance of the microporous polyethylene membrane may be impaired, and in particular, a problem of lower strength may manifest. Therefore, to ensure productivity, safety, and output characteristics of a battery while improving oxidation resistance of a separator that relates to battery life, it has been demanded to maintain excellent permeability and strength balance of a microporous polyethylene membrane. Therefore, an object to be achieved by the present invention is to provide a multilayer, microporous polyolefin membrane which has excellent oxidation resistance and electrolyte injection performance and further has excellent permeability and strength balance.

Means for Solving the Problems

The multilayer, microporous polyolefin membrane of the present invention for solving the above problems has the following configuration. That is, a multilayer, microporous polyolefin membrane having a first microporous layer containing polypropylene, an electrolyte injection performance being 20 seconds or less, at least one surface layer being the first microporous layer, and a polypropylene distribution (hereinafter, "PP distribution") in the first microporous layer being uniform in an in-plane direction.

The method of producing the multilayer, microporous polyolefin membrane of the present invention for solving the above problems has the following configuration. That is, a method of producing a multilayer, microporous polyolefin membrane, the method comprising:

(a) a process of preparing a polyolefin solution by melt-kneading a polyolefin resin and a solvent for membrane formation, the process comprising:

(a-1) a process of preparing a first polyolefin solution by melt-kneading a first polyolefin resin containing polyethylene having a weight average molecular weight of less than $1.0 \times 10^6$ and polypropylene having a weight average molecular weight of greater than $6.0 \times 10^4$ but less than $3.0 \times 10^5$, and a solvent for membrane formation, and (a-2) a process of preparing a second polyolefin solution by melt-kneading a second polyolefin resin containing polyethylene having a weight average molecular weight of less than $1.0 \times 10^6$ and ultra high molecular weight polyethylene having a weight average molecular weight of $1.0 \times 10^6$ or greater, and a solvent for membrane formation;

(b) a process of forming an extrudate by extruding the polyolefin solution at a shear rate of 60/sec or greater;

(c) a process of forming a gel-like sheet by cooling the obtained extrudate at a cooling rate of 30° C./sec or greater;

(d) a process of producing a stretched body by stretching the obtained gel-like sheet in at least uniaxial direction; and (e) a process of removing the solvent for membrane formation from the obtained stretched body.

The multilayer, microporous polyolefin membrane of the present invention preferably has an average value of normalized polypropylene/polyethylene ratio (hereinafter, "normalized PP/PE ratio") of 0.5 or greater, a standard deviation of the normalized PP/PE ratio of 0.2 or less, kurtosis of the normalized PP/PE ratio of −1.0 to 1.0, in the first microporous layer determined by Raman spectroscopy.

In the multilayer, microporous polyolefin membrane of the present invention, the polypropylene preferably has a weight average molecular weight of greater than $6.0 \times 10^4$ but less than $3.0 \times 10^5$, and the first microporous layer preferably contains 0.5% by weight or greater but less than 5% by weight of the polypropylene per 100% by weight of an entire polyolefin resin of the first microporous layer.

In the multilayer, microporous polyolefin membrane of the present invention, pin puncture strength ($Punc_1$) of the first microporous layer is preferably from 4500 mN/20 μm to 7000 mN/20 μm, and porosity ($Po_1$) of the first microporous layer is preferably from 40% to 50%.

In the multilayer, microporous polyolefin membrane of the present invention, the pin puncture strength ($Punc_1$) of the first microporous layer and the porosity ($Po_1$) of the first microporous layer preferably satisfy a relationship described in Formula (A) below:

$$110 \leq Po_1 + 0.01275 \times Punc_1 \leq 122 \quad \text{Formula (A)}$$

$Po_1$: Porosity (%) of the first microporous layer
$Punc_1$: Puncture strength (mN/20 μm) of the first microporous layer, normalized for the thickness of 20 μm.

In the multilayer, microporous polyolefin membrane of the present invention, the first microporous layer is preferably formed from a first polyolefin resin, and the first polyolefin resin preferably contains polyethylene having a weight average molecular weight of less than $1.0 \times 10^6$, ultra high molecular weight polyethylene having a weight average molecular weight of $1.0 \times 10^6$ or greater, and polypropylene having a weight average molecular weight of greater than $6.0 \times 10^4$ but less than $3.0 \times 10^5$.

In the multilayer, microporous polyolefin membrane of the present invention, the first polyolefin resin preferably contains high density polyethylene having a weight average molecular weight of $5.0 \times 10^4$ or greater but less than $5.0 \times 10^5$ (at an amount of 45.0% by weight to 98.5% by weight per 100% by weight of the entire first polyolefin resin), ultra high molecular weight polyethylene having a weight average molecular weight of $1.0 \times 10^6$ or greater but less than $3.0 \times 10^6$ (at an amount of 1.0% by weight to 55.0% by weight per 100% by weight of the entire first polyolefin resin), and polypropylene having a weight average molecular weight of greater than $6.0 \times 10^4$ but less than $3.0 \times 10^5$ (at an amount of 0.5% by weight or greater but less than 5.0% by weight per 100% by weight of the entire first polyolefin resin).

The multilayer, microporous polyolefin membrane of the present invention preferably has a second microporous layer that is formed from a second polyolefin resin and that is arranged in between two surface layers.

In the multilayer, microporous polyolefin membrane of the present invention, the second polyolefin resin preferably contains high density polyethylene having a weight average molecular weight of $5.0 \times 10^4$ or greater but less than $5.0 \times 10^5$ (at an amount of 50.0% by weight to 99.0% by weight per 100% by weight of the entire second polyolefin resin), and ultra high molecular weight polyethylene having a weight average molecular weight of $1.0 \times 10^6$ or greater but less than $3.0 \times 10^6$ (at an amount of 1.0% by weight to 50.0% by weight per 100% by weight of the entire second polyolefin resin), but preferably contains no polypropylene. The multilayer, microporous polyolefin membrane of the present invention preferably has a three-layer structure in which the second microporous layer is arranged in between two surface layers that are formed from the first microporous layers.

Effect of the Invention

The multilayer, microporous polyolefin membrane of the present invention is a multilayer, microporous polyolefin membrane containing polypropylene (PP) and having a first microporous layer containing polypropylene. In the multilayer, microporous polyolefin membrane, at least one surface layer is the first microporous layer, the PP distribution in the first microporous layer is uniform in the in-plane direction, and the electrolyte injection performance is 20 seconds or less, thereby achieving excellent oxidation resistance and electrolyte injection performance as well as excellent permeability and strength balance.

When a multilayer, microporous polyolefin membrane is used as a separator for a battery, if a part where the polyethylene concentration is locally high is present in the multilayer, microporous polyolefin membrane, deterioration of the multilayer, microporous polyolefin membrane may occur during charging and discharging of the battery. When the multilayer, microporous polyolefin membrane of the present invention is used as a separator for a battery, it is possible to suppress the deterioration caused during charging and discharging the battery and to prolong the battery life.

The multilayer, microporous polyolefin membrane of the present invention preferably contains polypropylene having a weight average molecular weight of greater than $6.0 \times 10^4$ but less than $3.0 \times 10^5$ in the first microporous layer at an amount of 0.5% by weight or greater but less than 5% by weight per 100% by weight of the entire polyolefin resin of the first microporous layer. This leads to excellent air permeability and strength balance, and equivalent level of electrolyte injection performance as that of multilayer, microporous polyethylene membrane. The content of the particular polypropylene of is preferably less than 5% by weight, since distribution of the membrane thickness will be uniform. When the multilayer, microporous polyolefin membrane of the present invention is used as a separator for a battery, productivity of the battery can be enhanced, and the battery life can be prolonged due to its excellent oxidation resistance.

In the multilayer, microporous polyolefin membrane of the present invention, pin puncture strength ($Punc_1$) of the first microporous layer is preferably from 4500 mN/20 μm to 7000 mN/20 μm, and porosity ($Po_1$) of the first microporous layer is preferably from 40% to 50%. When the multilayer, microporous polyolefin membrane of the present invention is used as a battery separator, the deterioration of the separator is suppressed even when charging of the battery is continued after the battery is fully charged, and thus the battery life can be prolonged.

In the multilayer, microporous polyolefin membrane of the present invention, the pin puncture strength ($Punc_1$) of the first microporous layer and the porosity ($Po_1$) of the first microporous layer preferably satisfy a relationship described in Formula (A) below. This leads to even more excellent oxidation resistance, and the battery life can be prolonged.

$$110 \leq Po_1 + 0.01275 \times Punc_1 \leq 122 \quad \text{Formula (A)}$$

$Po_1$: Porosity (%) of the first microporous layer $Punc_1$: Puncture strength (mN/20 μm) of the first microporous layer, normalized for the thickness of 20 μm.

Furthermore, the method of producing the multilayer, microporous polyolefin membrane of the present invention comprises:

(a) a process of preparing a polyolefin solution by melt-kneading a polyolefin resin and a solvent for membrane formation (the polyolefin resin contains polyethylene as a main component, and contains from 1 to 50% by weight of ultra high molecular weight polyethylene having a weight average molecular weight of $1.0 \times 10^6$ or greater, per 100% by weight, and 0.5% by weight or greater but less than 5% by weight of polypropylene having a weight average molecular weight of greater than $6.0 \times 10^4$ but less than $3.0 \times 10^5$);

(b) a process of forming an extrudate by extruding the polyolefin solution at a shear rate of 60/sec or greater;

(c) a process of forming a gel-like sheet by cooling the obtained extrudate at a cooling rate of 30° C./sec or greater;

(d) a process of producing a stretched body by stretching the obtained gel-like sheet in at least uniaxial direction; and (e) a process of removing the solvent for membrane formation from the obtained stretched body.

Thereby, the multilayer, microporous polyolefin membrane having the characteristics described above can be efficiently produced.

MODE FOR CARRYING OUT THE INVENTION

Figure 1:
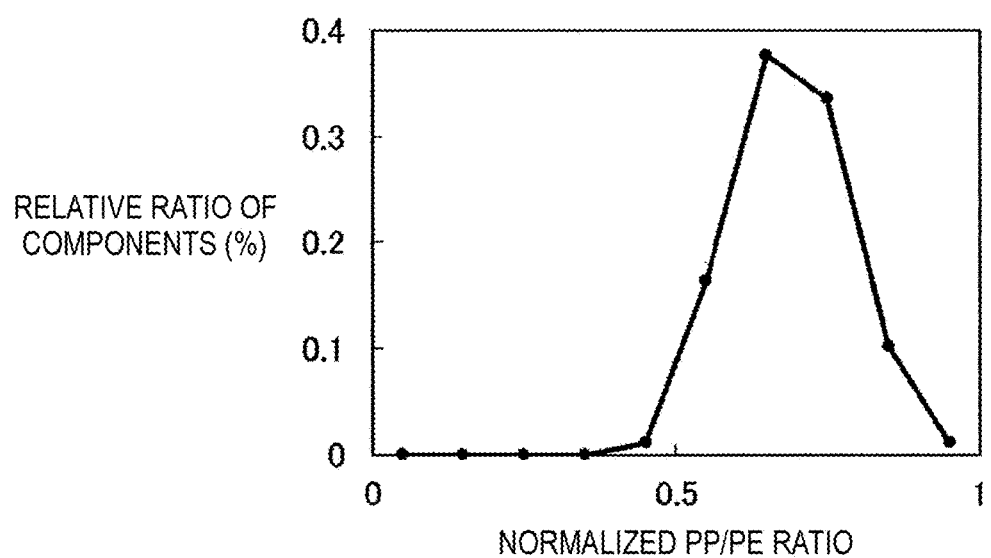
FIG. 1 is a distribution diagram of normalized PP/PE ratio of a first microporous layer of a multilayer, microporous polyolefin membrane (Working Example 3) of the present invention.

The mode for carrying out the present invention will be described in detail below. Note that the present invention is not limited to the following embodiments, and various modifications may be added within the scope of the present invention.

The multilayer, microporous polyolefin membrane of the present invention has two or more layers, and preferably three layers, and at least one of the layers is a first microporous layer. The first microporous layer in the multilayer, microporous polyolefin membrane of the present invention contains polyethylene as a main component and is formed from a polyolefin resin containing polypropylene (first polyolefin resin). Furthermore, the first microporous layer is at least one of the surface layers of the multilayer, microporous polyolefin membrane of the present invention. Another layer, other than the first microporous layer, may be a second microporous layer formed from a second polyolefin resin. The multilayer, microporous polyolefin membrane of the present invention preferably has a three-layer structure in which the first microporous layers are two surface layers (skin layers) and the second microporous layer is arranged in between the two surface layers (core layer).

The polyolefin resin used in the multilayer, microporous polyolefin membrane of the present invention will be described below.

[1] Raw Material

[Polyolefin Resin]

The first and second polyolefin resins constituting the multilayer, microporous polyolefin membrane of the present invention contain polyethylene (PE) as a main component, and the proportion of the polyethylene is preferably 80% by weight or greater, and more preferably 90% by weight or greater, per 100% by weight of the entire polyolefin resin. The first and second polyolefin resins may be compositions containing resins other than polyolefin. Therefore, the term "polyolefin resin" may include a resin that contains not only polyolefin but also contains a resin other than polyolefin.

[First Polyolefin Resin]

In the multilayer, microporous polyolefin membrane of the present invention, the first microporous layer is formed from the first polyolefin resin. The first polyolefin resin contains polypropylene in addition to the polyethylene. Each of the components will be described in detail below.

Polyethylene

The polyethylene is preferably (a) polyethylene having an Mw (weight average molecular weight) of less than $1.0 \times 10^6$ (hereinafter, "PE (A)"), or (b) a composition formed from the PE (A) and ultra high molecular weight polyethylene (UHMwPE) having an Mw of $1.0 \times 10^6$ or greater (hereinafter, "PE composition (B)").

The ratios of the Mw to the number average molecular weight (Mn), the ratio Mw/Mn (molecular weight distribution), of the PE (A) and the PE composition (B) are not limited; however, the ratio is preferably in the range of 5 to 300, more preferably in the range of 5 to 100, and particularly preferably in the range of 5 to 25. When the Mw/Mn is within the range described above, extrusion of the polyethylene solution is facilitated, and the strength of the resulting multilayer, microporous polyolefin membrane becomes excellent.

PE (A)

The PE (A) may be any of high density polyethylene (HDPE), medium density polyethylene (MDPE), and low density polyethylene (LDPE); however, the HDPE is preferable. The PE (A) may be an ethylene homopolymer or a copolymer that also contains other α-olefin at a little amount. Examples of the α-olefin other than ethylene include propylene, butene-1, hexene-1, pentene-1, 4-methylpentene-1, octene, vinyl acetate, methyl methacrylate, styrene, and the like.

The PE (A) may be, for example, polyethylene having a weight average molecular weight (Mw) of less than $1.0 \times 10^6$, such as in the range of approximately $2.0 \times 10^5$ to approximately $0.9 \times 10^6$, and a molecular weight distribution (MWD, defined as a value obtained by dividing Mw by the number average molecular weight Mn) in the range of approximately 2.0 to 50.0, and having unsaturated terminal groups of less than 0.20 groups per 10,000 carbon atoms. The Mw of the PE (A) is preferably $1.0 \times 10^4$ or greater but less than $5.0 \times 10^5$. In particular, the Mw of the HDPE is more preferably $5.0 \times 10^4$ or greater but less than $4.0 \times 10^5$. The PE (A) may be formed from two or more types of substances having Mws or densities that differ from each other. Optionally, the PE (A) has unsaturated terminal groups at an amount of 0.14 or less or 0.12 or less, such as in the range of 0.05 to 0.14 groups, per 10,000 carbon atoms (e.g. less than the measuring limit).

PE Composition (B)

When the polyethylene is the PE composition (B), the upper limit of the PE (A) is preferably 98.5% by weight, and more preferably 94.0% by weight, per 100% by weight of the entire first polyolefin resin. The lower limit of the PE (A) is preferably 45.0% by weight, and more preferably 46.5% by weight.

The content of the UHMwPE is preferably 55.0% by weight or less per 100% by weight of the entire first polyolefin resin. The content is particularly preferably 45.0% by weight or less. When this content is within the preferable range described above, increase in pressure during forming will not occur, and productivity will be excellent. Furthermore, the lower limit of the content is not particularly limited; however, from the perspectives of maintaining mechanical strength and maintaining high melt down temperature, the lower limit is more preferably 1.5% by weight, and particularly preferably 30.0% by weight. By setting the content of the UHMwPE to be from 1.0% by weight to 50.0% by weight, a multilayer, microporous polyolefin membrane having excellent strength and air permeability balance can be obtained.

The Mw of the UHMwPE is preferably in the range of $1.0 \times 10^6$ to $3.0 \times 10^6$. By setting the Mw of the UHMwPE to be $3.0 \times 10^6$ or less, melt extrusion can be facilitated. The UHMwPE may be an ethylene homopolymer or a copolymer that also contains other α-olefin at a little amount. The other α-olefin other than ethylene may be the same as those described above.

The PE composition (B) may contain, as an optional component, either polybutene-1 having an Mw of $1.0 \times 10^4$ to $4.0 \times 10^6$ or an ethylene/α-olefin copolymer having an Mw of $1.0 \times 10^4$ to $4.0 \times 10^6$. These optional components are preferably contained at an amount of 40% by weight or less per 100% by weight of the entire first polyolefin resin.

Polypropylene

The content of the polypropylene is preferably less than 5.0% by weight per 100% by weight of the entire first polyolefin resin. The upper limit of the content of the polypropylene is preferably 3.5% by weight. The lower limit of the content of the polypropylene is preferably 0.5% by weight, and more preferably 1% by weight. When the content of the polypropylene is within the range described above, oxidation resistance, membrane uniformity, and strength will be enhanced.

The Mw of the polypropylene is preferably greater than $6.0 \times 10^4$ but less than $3.0 \times 10^5$, and more preferably greater than $6.0 \times 10^4$ but less than $1.5 \times 10^5$. The molecular weight distribution (Mw/Mn) of the polypropylene is preferably from 1.01 to 100, and more preferably from 1.1 to 50. The polypropylene may be a single type of polypropylene or a composition containing two or more types of polypropylene.

Although the melting point of the polypropylene is not limited, the melting point of the polypropylene is preferably from 150 to 175° C., and more preferably from 150 to 160° C.

The polypropylene may be a homopolymer or a block copolymer and/or random copolymer containing other α-olefin or diolefin. As the other olefin, ethylene or α-olefin having from 4 to 8 carbons is preferable. Examples of the α-olefin having from 4 to 8 carbons include 1-butene, 1-hexene, 4-methyl-1-pentene, and the like. The number of carbons in diolefin is preferably from 4 to 14. Examples of the diolefin having from 4 to 14 carbons include butadiene, 1,5-hexadiene, 1,7-octadiene, 1,9-decadiene, and the like. The content of the other olefin or diolefin is preferably less than 10 mol % per 100 mol % of the propylene copolymer.

[Second Polyolefin Resin]

An aspect of the second polyolefin resin, which constitutes the second microporous layer, is as described below.

The second polyolefin resin contains polyethylene. As the polyethylene, polyethylene described for the first polyolefin resin can be used. That is, the polyethylene is preferably (a) polyethylene having an Mw (weight average molecular weight) of less than $1.0 \times 10^6$ (PE (A)), or (b) a composition formed from the PE (A) and ultra high molecular weight polyethylene (UHMwPE) having an Mw of $1.0 \times 10^6$ or greater (PE composition (B)). The second polyolefin resin preferably contains no polypropylene.

When the polyethylene is the PE composition (B), the upper limit of the PE (A) is preferably 99.0% by weight, and more preferably 95.0% by weight, per 100% by weight of the entire second polyolefin resin. The lower limit of the PE (A) is preferably 50.0% by weight, and more preferably 80.0% by weight.

The content of the UHMwPE is preferably 50.0% by weight or less per 100% by weight of the entire second polyolefin resin. The content is particularly preferably 20.0% by weight or less. When this content is within the range described above, increase in pressure during forming will be suppressed, and productivity will be enhanced. Furthermore, the lower limit of the content is not particularly limited; however, from the perspectives of maintaining mechanical strength and maintaining high melt down temperature, the lower limit is more preferably 1.0% by weight, and particularly preferably 5.0% by weight. By setting the content of the UHMwPE to be from 1.0% by weight to 50.0% by weight, a multilayer, microporous polyolefin membrane having excellent strength and air permeability balance can be obtained.

In the PE composition (B), either polybutene-1 having an Mw of $1.0 \times 10^4$ to $4.0 \times 10^6$ or an ethylene/α-olefin copolymer having an Mw of $1.0 \times 10^4$ to $4.0 \times 10^6$ may be added as an optional component. The added amount of these is preferably 40% by weight or less per 100% by weight of the entire second polyolefin resin.

[Components, Other than Polyethylene and Polypropylene, in Polyolefin Resin]

As described above, the first and second polyolefin resins may be polyolefin other than polyethylene and polypropylene, and/or composition(s) that contain a resin other than polyolefin. Examples of the polyolefin other than polyethylene and polypropylene include homopolymers and copolymers of polybutene-1, pentene-1, hexene-1,4-methyl-pentene-1, octene, and the like.

Furthermore, when the polyolefin resin contains a heat-resistant resin, storage characteristics at high temperatures of a battery can be further enhanced since, when the multilayer, microporous polyolefin membrane is used as a separator for the battery, melt down temperature will be higher.

As the heat-resistant resin, heat-resistant resins that are described in WO2006/137540 and the like can be used. The added amount of the heat-resistant resin is preferably from 3 to 20% by weight, and more preferably from 3 to 15% by weight, per 100% by weight of the entire polyolefin resin. When this content is within the preferable range described above, mechanical strength, such as pin puncture strength and tensile strength at break, will be excellent.

Note that, when the multilayer, microporous polyolefin membrane of the present invention is composed of three or more layers of microporous layers, a third microporous layer or more microporous layers may be included. When the multilayer, microporous polyolefin membrane of the present invention is composed of three layers of microporous layers, the third microporous layer is positioned on a surface located on the opposite side of the first microporous layer. A resin that constitutes the third microporous layer is not particularly limited. Although the third microporous layer may be formed from the first polyolefin resin or the second polyolefin resin, the third microporous layer preferably contains no polypropylene.

[2] Method of Producing Multilayer, Microporous Polyolefin Membrane

The method of producing the multilayer, microporous polyolefin membrane of the present invention will be described below. Note that the method of producing the multilayer, microporous polyolefin membrane of the present invention is not limited to the description below.

The method of producing the multilayer, microporous polyolefin membrane of the presentation comprises:

(a) a process of preparing a polyolefin solution by melt-kneading a polyolefin resin and a solvent for membrane formation, the process comprising:

(a-1) a process of preparing a first polyolefin solution by melt-kneading a first polyolefin resin containing polyethylene having a weight average molecular weight of less than $1.0 \times 10^6$ and polypropylene having a weight average molecular weight of greater than $6.0 \times 10^4$ but less than $3.0 \times 10^5$, and a solvent for membrane formation, and (a-2) a process of preparing a second polyolefin solution by melt-kneading a second polyolefin resin containing polyethylene having a weight average molecular weight of less than $1.0 \times 10^6$ and ultra high molecular weight polyethylene having a weight average molecular weight of $1.0 \times 10^6$ or greater, and a solvent for membrane formation;

(b) a process of forming an extrudate by extruding the polyolefin solution at a shear rate of 60/sec or greater;

(c) a process of forming a gel-like sheet by cooling the obtained extrudate at a cooling rate of 30° C./sec or greater;

(d) a process of producing a stretched body by stretching the obtained gel-like sheet in at least uniaxial direction; and (e) a process of removing the solvent for membrane formation from the obtained stretched body.

The method of producing the multilayer, microporous polyolefin membrane of the present invention can be classified into four types depending on the lamination method, the method will be described below based on this classification.

(2-1) First Production Method

The first production method for producing the multilayer, microporous polyolefin membrane of the present invention comprises: (i) preparing a first polyolefin solution by melt-kneading a first polyolefin resin and a solvent for membrane formation; (ii) preparing a second polyolefin solution by melt-kneading a second polyolefin resin and a solvent for membrane formation; (iii) simultaneously extruding the first and second polyolefin solutions from one die; and (iv) cooling the obtained extrudate to form a gel-like sheet. The method further comprises: (v) a process of forming a stretched body by stretching the gel-like sheet in at least uniaxial direction (first stretching process); (vi) a process of removing (washing) the solvent for membrane formation from the stretched body; and (vii) a process of drying the membrane after the washing. After the processes (i) to (vii), the method may further comprise: (viii) a process of stretching the dried membrane again in at least uniaxial direction (second stretching process); and (ix) a process of performing heat treatment. As necessary, heat setting treatment process, hot roll treatment process, or hot solvent treatment process may be provided before (vi) the solvent for membrane formation removal process. Furthermore, after the processes (i) to (ix), a drying process, heat treatment process, cross-linking treatment process using ionizing radiation, hydrophilization treatment process, surface coating treatment process, and the like may be provided. Furthermore, after (v) the first stretching process, a process of heat-treating the stretched body may be provided.

(i) Preparation of the First Polyolefin Solution

The first polyolefin solution is prepared by melt-kneading a first polyolefin resin and a solvent for membrane formation. After blending a suitable solvent for membrane formation with the first polyolefin resin described above, the mixture is melt-kneaded to prepare a polyolefin resin solution. As a method of melt-kneading, methods using a twin-screw extruder described in Japanese Patent No. 2132327 and Japanese Patent No. 3347835 can be used. Since methods of melt-kneading are publicly known, explanation is omitted. However, the polyolefin resin concentration of the polyolefin resin solution is from 20 to 50% by weight, and preferably from 25 to 45% by weight, of the polyolefin resin per 100% by weight total of the polyolefin resin and the solvent for membrane formation. When the polyolefin resin concentration of the polyolefin resin solution is within the range described above, decrease in productivity and/or decrease in formability of the gel-like sheet are prevented.

As the first polyolefin resin, the same substances that are described above can be used.

(i) Preparation of the Second Polyolefin Solution

The second polyolefin solution is prepared by melt-kneading a second polyolefin resin and a solvent for membrane formation. The solvent for membrane formation used in the second polyolefin solution may be the same or different solvent as the solvent for membrane formation used in the first polyolefin solution; however, the solvent for membrane formation used in the second polyolefin solution is preferably the same solvent as the solvent for membrane formation used in the first polyolefin solution. The other parts of the preparation method are the same as in the method for preparing the first polyolefin solution.

As the second polyolefin resin, the same substances that are described above can be used.

(iii) Extrusion

From extruders, each of the first and second polyolefin solutions are separately fed to a die, and both of these solutions are combined in a layered-form in the die and then extruded in a sheet shape. When a multilayer, microporous polyolefin membrane having a structure of three or more layers is produced, the both solutions are combined in the layered-form in a manner so that the first polyolefin solution forms at least one surface layer (first microporous layer) and the second polyolefin solution forms at least one layer in between the two surface layers (second microporous layer) (preferably, in a manner that the layer is in contact with one or both of the surface layers), and then extruded in a sheet form.

The method of extrusion may be the flat die method or the inflation method. In both methods, a method in which the solutions are laminated in the layered-form at the lip entrance of a die for forming multilayer by supplying the solutions to respective manifolds (multiple manifold method), or a method in which the solutions are formed into a layered flow in advance to be supplied to a die (block method) can be used. Since the multiple manifold method and the block method are publicly known, detailed explanation of these is omitted. The gap of the flat die for multilayer is preferably from 0.1 to 5 mm. The extrusion temperature is preferably from 140 to 250° C., and the extrusion rate is preferably from 0.2 to 15 m/minute. The ratio of the membrane thicknesses of the first and second microporous layers can be controlled by adjusting the extruded amount of each of the first and second polyolefin solutions.

The ratio (L/D) of the length (L) to the diameter (D) of the screw of the twin-screw extruder is preferably in the range of 20 to 100. The cylinder inner diameter of the twin-screw extruder is preferably from 40 to 200 mm. When the polyolefin resin is introduced into the twin-screw extruder, the ratio Q/Ns, which is the ratio of the charged amount Q (kg/h) of the polyolefin resin solution to the number of rotation Ns of the screw (rpm), is preferably set to be 0.1 to 0.55 kg/h/rpm. The number of rotation Ns of the screw is preferably 180 rpm or greater. The upper limit of the number of rotation Ns of the screw is not particularly limited; however, the upper limit is preferably 500 rpm.

Although methods disclosed in Japanese Patent No. 2132327 and Japanese Patent No. 3347835 can be used as the method of extrusion, the method of producing the multilayer, microporous polyolefin membrane of the present invention is characterized in that the shear rate of the polyolefin resin solution containing the first polyolefin resin solution from the die is 60/sec or greater. The shear rate from the die is more preferably 150/sec or greater.

(iv) Formation of Gel-Like Sheet

A gel-like sheet is formed by cooling the extrudate obtained by (iii). As a method of forming a gel-like sheet, methods disclosed in Japanese Patent No. 2132327 and Japanese Patent No. 3347835 can be used. Cooling is preferably performed until the temperature of the extrudate becomes 40° C. or lower. By cooling, the microphase of the polyolefin that is separated by the solvent for membrane formation can be immobilized. As the method of cooling, a method of bringing into contact with coolant, such as cold air and cooling water, a method of bringing into contact with a cooling roll, and the like can be used.

The method of producing the multilayer, microporous polyolefin membrane of the present invention is characterized in that the cooling rate of the extrudate of the polyolefin resin solution containing the first polyolefin resin solution is 30° C./sec or greater.

By appropriately controlling the shear rate from the die and the cooling rate, it is easy to make the polypropylene distribution within the gel-like sheet to be uniform, and oxidation resistance and electrolyte injection performance will be excellent.

(v) First Stretching Process

The obtained gel-like sheet is stretched in at least uniaxial direction. The first stretching causes cleavage between polyethylene crystal lamella layers, and the polyethylene phase becomes finer, forming large numbers of fibrils. The resulting fibrils form a three-dimensional network structure (three-dimensionally and irregularly connected network structure). Since the gel-like sheet contains the solvent for membrane formation, the gel-like sheet can be stretched uniformly. The first stretching can be performed at a predetermined ratio using a typical tenter method, roll method, inflation method, rolling method, or a combination of these methods after the gel-like sheet is heated. The first stretching may be uniaxial stretching or biaxial stretching; however, biaxial stretching is preferable. In the case of biaxial stretching, simultaneous biaxial stretching or successive stretching can be performed.

The stretching ratio varies depending on the thickness of the gel-like sheet. For uniaxial stretching, the stretching ratio is preferably the magnification factor of 2 or greater, and more preferably the magnification factor of 3 to 30. For biaxial stretching, the stretching ratio is preferably the magnification factor of 3 or greater in both directions, i.e. magnification factor of 9 or greater in terms of area ratio, thereby enhancing pin puncture strength of the resulting multilayer, microporous polyolefin membrane and making it possible to achieve high elasticity and high strength. Furthermore, when the area ratio is within the preferable range described above, no restriction is imposed on the stretching device, stretching operation, and the like. Note that, for the biaxial stretching, the stretching ratios in both directions are preferably set to the same value.

The temperature of the first stretching is preferably at lower than or equal to a temperature that is approximately 10° C. higher than the melting point of the polyethylene used in the preparation of the polyolefin solution. The stretching temperature may be in the range higher than Tcd but lower than Tme. The Tme and Tcd are a melting point of all the polyethylene used in the preparation of the polyolefin solution and a crystal dispersion temperature, respectively.

When the stretching temperature is lower than or equal to the Tme+10° C., the alignment of the molecular chains of the polyolefin in the gel-like sheet tends to be promoted during the stretching. Meanwhile, when the stretching temperature is Tcd or higher, breakage of the membrane due to stretching is suppressed, thereby enabling the stretching at a high ratio. In one embodiment, the stretching temperature is approximately from 90° C. to 140° C., or approximately from 100° C. to 130° C. When the polyolefin resin is formed from 90% by weight or greater of polyethylene, the stretching temperature is typically in the range of 90° C. to 130° C., preferably in the range of 100° C. to 125° C., and more preferably in the range of 105° C. to 120° C.

Tme of the PE (A), ultra high molecular weight polyethylene (UHMwPE), or polyethylene composition (PE composition (B)) is typically approximately from 130° C. to 140° C., and Tcd is approximately from 90° C. to 100° C. Tcd can be determined from temperature characteristics of dynamic viscoelasticity in accordance with ASTM D 4065.

In the first stretching, multistage stretching at different temperatures may be performed, and the stretching temperatures of an earlier stage and a later stage, and the final stretched ratio are within each of the ranges described above. Depending on the desired physical properties, the stretching may be performed while the temperature distribution is present in a membrane thickness direction. Thereby, the multilayer, microporous polyolefin membrane having even more excellent mechanical strength can be obtained. As such a method, for example, a method disclosed in Japanese Patent No. 3347854 can be used.

(iv) Solvent for Membrane Formation Removal (Washing) Process

Thereafter, the solvent for membrane formation that remains in the stretched gel-like sheet (stretched body) is removed using a cleaning solvent. Since the polyolefin phase is phase-separated from the solvent for membrane formation, a porous membrane can be obtained by removing the solvent for membrane formation. Cleaning solvents and methods of removing the solvent for membrane formation using the cleaning solvent has been publicly known, and thus explanation is omitted. For example, methods disclosed in Japanese Patent No. 2132327 or Japanese Unexamined Patent Application Publication No. 2002-256099 can be used.

(vii) Membrane Drying Process

The multilayer, microporous polyolefin membrane obtained by removal of the solvent for membrane formation is dried using a heat drying method, air drying method, or the like.

(viii) Second Stretching Process

Furthermore, after the drying, the membrane may be stretched again in at least uniaxial direction. The second stretching can be performed by a tenter method or the like in the same manner as in the first stretching while the membrane is heated. The second stretching may be uniaxial stretching or biaxial stretching.

The temperature of the second stretching may be almost the same as or lower than the melting point Tme of all the polyethylene used in the preparation of the polyolefin solution. In one embodiment, the temperature of the second stretching is approximately from Tcd to Tme. When the temperature of the second stretching is Tme or lower, permeability of the obtained multilayer, microporous polyolefin membrane will be appropriate, and unevenness of the physical properties such as permeability in a lateral direction (width direction: TD direction) tends to be suppressed. Meanwhile, when the temperature of the second stretching is Tcd or higher, breakage of the membrane due to stretching is suppressed, thereby enabling uniform stretching. When the polyolefin resin is formed from polyethylene, the stretching temperature is typically in the range of 90° C. to 140° C., and preferably in the range of 100° C. to 140° C.

The ratio of the second stretching in a uniaxial direction is preferably set to the magnification factor of 1.1 to 1.8. For example, in the case of uniaxial stretching, the magnification factor is from 1.1 to 1.8 in an MD direction (refers to a direction of membrane production; also referred to as "machine direction" and "length direction") or a TD direction (refers to a direction that is in the same plane as the length direction and that is perpendicular to the length direction; also referred to as "lateral direction"). In the case of biaxial stretching, the magnification factor is from 1.1 to 1.8 in each of the MD direction and the TD direction. In the case of the biaxial stretching, stretching ratios in MD direction and TD direction may differ each other as long as the each of the stretching ratios is from 1.1 to 1.8 in magnification. When the stretching ratio is within the range described above, it was confirmed that permeability, heat shrinkage resistance, electrolyte absorbency, and compression resistance of the obtained multilayer, microporous polyolefin membrane tend to be enhanced. The ratio of the second stretching is more preferably set to 1.2 to 1.6 magnification.

The rate of the second stretching is preferably at 3%/sec or greater in a stretching axis direction. For example, in the case of uniaxial stretching, the rate is 3%/sec or greater in the MD direction or the TD direction. In the case of biaxial stretching, the rate is 3%/sec or greater in each of the MD direction and the TD direction. The stretching rate (%/sec) in the stretching axis direction indicates a proportion of a length that is stretched per 1 second in the region where a membrane (sheet) is restretched, using the length in the stretching axis direction of the membrane before restretching as 100%. When the stretching rate is 3%/sec or greater, permeability of the obtained multilayer, microporous polyolefin membrane will be appropriate, and unevenness of the physical properties such as permeability in a sheet width direction tends to be suppressed. The rate of the second stretching is preferably 5%/sec or greater, and more preferably 10%/sec or greater. In the case of biaxial stretching, as long as the stretching rate is 3%/sec or greater in each of the MD direction and the TD direction, the stretching rates may differ each other in the MD direction and the TD direction; however, the stretching rates are preferably the same. The upper limit of the rate of the second stretching is not particularly limited; however, from the perspective of preventing breakage, the stretching rate is preferably 50%/sec or less.

(ix) Heat Treatment Process

The membrane after the second stretching may be subjected to heat treatment. The multilayer, microporous polyolefin membrane in which a network formed from fibrils formed by the second stretching is maintained and which has a large pore diameter and excellent strength can be produced. The heat treatment can be performed by heat setting treatment and/or thermal relaxation treatment. The heat setting treatment is a heat treatment that heats in a manner that the membrane diameter is maintained and not changed. The thermal relaxation treatment is a heat treatment in which the membrane is thermally shrunk in the MD direction and/or TD direction during the heating. In particular, the crystals in the membrane are stabilized by the heat setting treatment. The heat treatment can be performed by using a conventional method such as a tenter method, roll method, or rolling method. For example, a method disclosed in Japanese Unexamined Patent Application Publication No. 2002-256099 can be exemplified as the thermal relaxation treatment method.

The heat treatment is performed at a temperature in the range of the crystal dispersion temperature or higher to the melting point or lower of all the polyolefin resin constituting the multilayer, microporous polyolefin membrane.

The temperature for the heat setting treatment is preferably in the range of ±5° C. of the temperature of the second stretching. Thereby physical properties are stabilized. This temperature is more preferably in the range of ±3° C. of the temperature of the second stretching.

An in-line system in which the first stretching, solvent for membrane formation removal, drying, second stretching, and heat treatment are continuously performed in one consecutive line is preferably employed, although it is not limited. However, as necessary, an off-line system, in which the membrane after the drying treatment is wound temporarily, and then the membrane is unwound and subjected to the second stretching and the heat treatment, may be employed.

(x) Other Processes

Before removing the solvent for membrane formation from the gel-like sheet that has undergone the first stretching, heat setting treatment process, hot roll treatment process, or hot solvent treatment process may be performed. Furthermore, a process of performing the heat setting treatment may be provided to the membrane after the washing or in the second stretching process. The method of performing the heat setting treatment for the stretched gel-like sheet before and/or after the washing and for the membrane in the second stretching process may be the same as described above.

(2-2) Second Production Method

The second method for producing the multilayer, microporous polyolefin membrane comprises: (i) preparing a first polyolefin solution by melt-kneading a first polyolefin resin and a solvent for membrane formation; (ii) preparing a second polyolefin solution by melt-kneading a second polyolefin resin and a solvent for membrane formation; (iii-2) extruding the first and second polyolefin solutions from separate dies and, immediately after the extrusion, laminating the solutions; and (iv) cooling the obtained extrudate (laminate) to form a gel-like sheet. That is, compared to the first production method in which the polyolefin solutions are laminated in one die to form the extrudate, the second production method only differs in that the solutions are laminated immediately after being extruded from separate dies. Therefore, the same method as the first production method can be employed in the processes thereafter.

Since processes of the second method is the same as the processes in the first production method except for the process (iii-2), only the process (iii-2) will be described. In the process (iii-2), the first and second polyolefin solutions are separately extruded in a sheet shape from dies that are arranged close to each other and that are connected to each of a plurality of extruders, and the solutions are immediately laminated while the temperature thereof is still high (e.g. 100° C. or higher) to form a laminated extrudate. The other processes may be the same as those of the first production method.

(2-3) Third Production Method

The third production method for producing the multilayer, microporous polyolefin membrane comprises: (i) preparing a first polyolefin solution by melt-kneading a first polyolefin resin and a solvent for membrane formation; (ii) preparing a second polyolefin solution by melt-kneading a second polyolefin resin and a solvent for membrane formation; (iii-3-1) forming a first extrudate by extruding the first polyolefin solution from a die; (iii-3-2) forming a second extrudate by extruding the second polyolefin solution from another die; (iv-3) cooling the obtained first and second extrudates separately to form a first and a second gel-like sheet, respectively; (v-3) stretching the first and the second gel-like sheet separately; (xi-3) laminating the stretched first and the second stretched body; and (vi) removing the solvent for membrane formation from the obtained stretched body. That is, gel-like sheets are prepared separately until the gel-like sheets are stretched, and then laminated. The same method as the first production method can be employed in the processes thereafter. In between the processes (vi-3) and (vii-3), (viii-3) a stretching process of the gel-like laminated sheet or the like process can be provided. The processes (iii-3-1) and (iii-3-2) only differ, from the process (iii) of the first production method, in that the first and the second polyolefin solution are not combined in a layer form. The die used is the same die as that used in the process (iii-2) of the second production method. The process (iv-3) only differs, from the process (iv) of the first production method, in that the first and the second extrudate are separately cooled. The process (v-3) only differs, from the process (v) of the first production method, in that the first and the second gel-like sheet are separately stretched. On the other hand, the process (xi-3) is a process that is not provided in the first and the second production method, i.e. the process of laminating the first and the second stretched bodies; however, the lamination of the stretched bodies can be performed using a publicly known method.

(2-4) Fourth Production Method

The fourth production method for producing the multilayer, microporous polyolefin membrane comprises: (i) preparing a first polyolefin solution by melt-kneading a first polyolefin resin and a solvent for membrane formation; (ii) preparing a second polyolefin solution by melt-kneading a second polyolefin resin and a solvent for membrane formation; (iii-4-1) extruding the first polyolefin solution from a die; (iii-4-2) extruding the second polyolefin solution from another die; (iv-4) cooling each of the obtained extrudates separately to form a first and a second gel-like sheet, respectively; (v-4) stretching the first and the second gel-like sheet separately; (vi-4) removing the solvents for membrane formation from the obtained stretched bodies; (vii-4) drying the obtained first and second microporous polyolefin membrane; (viii-4) stretching at least the second microporous polyolefin membrane; and (xi-4) laminating the first and the second microporous polyolefin membrane. That is, microporous membranes are prepared separately and then laminated to form a multilayer, microporous membrane. As necessary, in between the processes (vii) and (viii-4), (ix-4) a heat treatment process may be performed separately to the first and the second microporous polyolefin membrane. Furthermore, the same method as the first production method can be employed in the processes thereafter.

Up to the process (v-4), the processes can be performed in the same manner as in the third production method. The process (vi-4) only differs, from the process (vi) of the first and the third production method, in that the solvents for membrane formation are removed from each of the first and the second stretched body. The process (vii-4) only differs, from the process (vii) of the first and the third production methods, in that the first and the second membrane are dried separately.

On the other hand, although the process (viii-4) is a process not necessarily needed in the first to the third production methods, at least the second microporous polyolefin membrane is restretched in this process (viii-4) in the fourth production method. The stretching temperature is preferably lower than or equal to the melting point, and more preferably higher than or equal to the crystal dispersion temperature but lower than or equal to the melting point. As necessary, the first microporous polyolefin membrane may be also stretched. The stretching temperature is preferably lower than or equal to the melting point, and more preferably higher than or equal to the crystal dispersion temperature but lower than or equal to the melting point. In cases where the first and/or the second microporous polyolefin membrane is stretched, the stretching ratio may be the same as that in the first production method except for the case where the unlaminated microporous polyolefin membrane is stretched.

Furthermore, the process (xi-4) is a process that is not provided in the first to the third production method, i.e. the process of laminating the first and second membranes; however, the lamination of the membranes can be performed using a publicly known method, in the same manner as in the lamination of the stretched body.

As described above, four types of the method of producing the multilayer, microporous polyolefin membrane of the present invention, classified depending on the lamination method, have been described. In summary, the following processes (a) to (e) are the necessary processes.

The process (a) corresponds to the process (i) and the process (ii) of the first to the fourth production methods.

The process (b) corresponds to the process (iii) of the first production method, the process (iii-2) of the second production method, the process (iii-3-1) of the third production method, and the process (iii-4-1) of the fourth production method.

The process (c) corresponds to the process (iv) of the first production method, the process (iv-2) of the second production method, the process (iv-3) of the third production method, and the process (iv-4) of the fourth production method.

The process (d) corresponds to the process (v) of the first and the second production methods, the process (v-3) of the third production method, and the process (v-4) of the fourth production method.

The process (e) corresponds to the process (vi) of the first to the third production methods and the process (vi-4) of the fourth production method.

[3] Structure and Physical Properties of Multilayer, Microporous Polyolefin Membrane and Measurement Methods Thereof The multilayer, microporous polyolefin membrane of the preferred embodiment of the present invention has the following physical properties. The structure and physical properties, and measurement methods thereof will be described below.

(1) Normalized PP/PE Ratio

The multilayer, microporous polyolefin membrane of the present invention has a structure in which the PP distribution in the first microporous layer is uniform in the in-plane direction. As an example of expression for the uniformity of the PP distribution, the uniformity can be expressed as a structure exhibiting specific values of average value/standard deviation/kurtosis of the normalized PP/PE ratio where the normalized PP/PE ratio, in terms of a peak intensity ratio of the PP to the PE (PP/PE ratio) determined by Raman microscope, is a relative value using the maximum PP/PE ratio on the membrane surface as 1. That is, the multilayer, microporous polyolefin membrane of the present invention preferably has a structure, which exhibits the normalized PP/PE ratio with the average value of 0.5 or greater, the standard deviation of 0.2 or less, and the kurtosis, a parameter indicating a distribution profile, of 1.0 or less but −1.0 or greater. Furthermore, the multilayer, microporous polyolefin membrane of the present invention preferably has a structure, which exhibits the normalized PE/PP ratio with the average value of 0.68 or greater, the standard deviation of 0.1 or less, and the kurtosis of 0.3 or less.

The method of measuring the PP/PE ratio on the membrane surface using the Raman microscope will be described below. By the Raman microscope, area analysis is performed using a laser with a wavelength of 532 nm for 1 to 2 micron in the thickness direction and in a field of view of 20×20 micron with a spot diameter of 1 micron, to measure the peak intensity ratio at a frequency of 807 cm$^{-1}$ (PP) to a frequency of 1127 cm$^{-1}$ (PE) for 400 points in total. A relative value, using the maximum peak intensity ratio in the field of view of 20×20 micron as 1, is referred to as "normalized PP/PE ratio".

It is conceived that, when the average value of the normalized PP/PE ratio is within the preferable range described above, regions having low polypropylene concentrations are small and regions mainly containing polyethylene do not increase, and deterioration is less likely to progress since the regions mainly containing polyethylene is small due to the oxidation reaction involved in the charging and discharging in the battery, thereby maintaining the cycle characteristics excellent.

When the standard deviation of the normalized PP/PE ratio is within the preferable range described above, since change in the polypropylene concentration is small and regions having low polypropylene concentrations are small, it is conceived that oxidation resistance is less likely to be deteriorated.

Furthermore, when the distribution of the polypropylene concentration is within the preferable range described above, regions having low propylene concentrations are small, and regions exhibiting poor oxidation resistance performance in the battery is less likely to be generated, thereby making the battery performance excellent. To some extent, presence of regions having high polypropylene concentrations facilitates improvement in oxidation resistance. These results show that an appropriate normalized PP/PE ratio distribution is necessary to improve oxidation resistance of the multilayer, microporous polyolefin membrane.

Since the multilayer, microporous polyolefin membrane of the present invention has the PP distribution that is uniform in the in-plane direction in the first microporous layer as described above, the multilayer, microporous polyolefin membrane has excellent oxidation resistance. Furthermore, it is preferable that the content of polypropylene is small, i.e. less than 5% by weight, since deterioration of physical properties due to the polypropylene will be suppressed and permeability, strength, and electrolyte absorbency will be excellent. Therefore, when the multilayer, microporous polyolefin membrane is used as a separator for lithium ion batteries, excellent battery productivity, safety, and battery cycle characteristics can be achieved.

(2) Air Permeability (sec/100 cm$^3$/20 μm)

The air permeability (Gurley value), normalized for the 20 μm membrane thickness of the multilayer, microporous polyolefin membrane of the present invention, is preferably from 20 to 600 sec/100 cm$^3$, and more preferably from 100 to 500 sec/100 cm$^3$. When the air permeability is within this range, battery capacity will be large when the multilayer, microporous polyolefin membrane is used as a separator for the battery, cycle characteristics of the battery will be also excellent, and shutdown occurs satisfactorily when the internal temperature of the battery increases. Meanwhile, when the multilayer, microporous polyolefin membrane is used in a battery, the resistance value is less likely to be increased during charging and discharging, and average electrochemical stability will be excellent. Note that the air permeability is measured in accordance with JIS P 8117 and converting the value normalized for the 20 μm membrane thickness.

(3) Porosity (%)

The porosity of the multilayer, microporous polyolefin membrane of the present invention is preferably from 25 to 80%, and more preferably from 30 to 50%. When the porosity is within the range described above, permeability and strength are appropriate when the multilayer, microporous polyolefin membrane is used as a separator for a battery, and short circuits of electrodes can be suppressed. The porosity is a value measured by a mass method.

$$\text{Porosity (\%)} = 100 \times (w2-w1)/w2$$

w1: Actual weight of the microporous membrane
w2: Weight of nonporous membrane of equivalent (the same polymer) having the same size and thickness.

Note that, in the case where gel-like sheets for surface layers and a middle layer are produced separately and then laminated to form a multilayer, the porosity of the first microporous layer is determined by forming a single gel-like sheet, which is the first microporous layer (surface layer), in the same forming conditions and measuring the porosity in the same manner. In the case where the gel-like sheet is produced by laminating in a die, only the first microporous layer part is collected from the surface layer of the gel-like laminated sheet at the outlet of the die, and then a membrane is formed in the same forming conditions to measure the porosity for the first microporous layer alone.

(4) Puncture Strength (mN/20 μm)

The pin puncture strength is a value determined by measuring the maximum load value for piercing the multilayer, microporous polyolefin membrane at a rate of 2 mm/sec using a needle having a diameter of 1 mm (0.5 mmR) and then converting the value normalized for the 20 μm membrane thickness. The pin puncture strength, normalized for the 20 μm membrane thickness of the multilayer, microporous polyolefin membrane of the present invention, is preferably 2,000 mN or greater, more preferably 2,500 mN or greater, and even more preferably 4,000 mN or greater. When the pin puncture strength is 2,000 mN/20 μm or greater, short circuits of electrodes can be effectively suppressed when the multilayer, microporous polyolefin membrane is incorporated into a battery as a separator for a battery.

Note that, in the case where gel-like sheets for surface layers and a middle layer are produced separately and then laminated to form a multilayer, the pin puncture strength of the first microporous layer is determined by forming a single gel-like sheet, which is the first microporous layer (surface layer), in the same forming conditions and measuring the pin puncture strength in the same manner. In the case where the gel-like sheet is produced by laminating in a die, only the surface layer part is collected from the gel-like laminated sheet at the outlet of the die, and then a membrane is formed in the same forming conditions to measure the pin puncture strength for the surface layer alone.

The pin puncture strength of the first microporous layer of the multilayer, microporous polyolefin membrane of the present invention is preferably from 4500 mN/20 μm to 7000 mN/20 μm, and more preferably from 4900 mN/20 μm to 6400 mN/20 μm. Furthermore, the porosity of the first microporous layer of the multilayer, microporous polyolefin membrane of the present invention is preferably from 40% to 50%. When the multilayer, microporous polyolefin membrane of the present invention having these physical properties is used as a separator for a battery, since the shape of the separator that is adjacent to an electrode can be maintained even when the electrode is expanded when the battery is fully charged, and since the separator can conform to the deformation of the electrode, electrolyte layer that is present in the electrode interface can be maintained. Therefore, even when the charging is continued after the battery is fully charged, deterioration of the separator can be suppressed, and the battery life can be prolonged.

The strength and porosity of the first microporous layer can be controlled by the resin composition, resin concentration, gel formation conditions (temperature, shear rate of extrusion, and cooling rate) of the first microporous layer, the first/second stretching conditions (temperature and ratio), and the like.

Furthermore, in the multilayer, microporous polyolefin membrane of the present invention, the pin puncture strength normalized for the 20 μm thickness of the first microporous layer ($Punc_1$) and the porosity ($Po_1$) of the first microporous layer preferably satisfy a relationship described in Formula (A).

$$110.8 \leq Po_1 + 0.125 \times Punc_1 \leq 122 \quad (A)$$

$Po_1$: Porosity (%) of the first microporous layer
$Punc_1$: pin puncture strength (mN/20 μm) normalized for the membrane thickness of the first microporous layer of 20 μm.

More preferably, the following relationship is satisfied.

$$115 \leq Po_1 + 0.125 \times Punc_1 \leq 120$$

The multilayer, microporous polyolefin membrane of the present invention can suppress the deterioration of the performance during charging and discharging of batteries, when the pin puncture strength and the porosity of the first microporous layer satisfy the relationship of Formula (A). It is conceived that this is because deterioration of wettability toward the electrolytic solution can be prevented since the separator and the electrode are brought into close contact upon the partial deformation of the separator even when the strength is small, and because partial reduction in ion permeability can be prevented due to its porosity that is originally high. It is also conceived that this is because, even when the strength is large, the electrolytic solution is less likely to be dried out in between the electrode and the separator since the close contact is ensured due to a large contact area to the battery as a result of low porosity, thereby deterioration of the battery performance can be suppressed.

(5) Tensile Strength at Break (kPa)

The tensile strength at break both in the MD direction and the TD direction of the multilayer, microporous polyolefin membrane of the present invention is 60,000 kPa or greater, more preferably 80,000 kPa or greater, and even more preferably 100,000 kPa or greater. The tensile strength at break of 60,000 kPa or greater facilitates the prevention of the membrane breakage during battery production.

The tensile strength at break is a value measured in accordance with ASTM D 882 using a strip-like test sample having a width of 10 mm.

(6) Tensile Elongation at Break (%)

The tensile elongation at break both in the MD direction and the TD direction of the multilayer, microporous polyolefin membrane of the present invention is preferably 80% or greater, and more preferably 100% or greater. This facilitates the prevention of the membrane breakage during battery production. The tensile elongation at break is a value measured in accordance with ASTM D 882 using a strip-like test sample having a width of 10 mm.

(7) Heat Shrinkage (%)

The heat shrinkage both in the MD direction and the TD direction, after the multilayer, microporous polyolefin membrane of the present invention is exposed at a temperature of 105° C. for 8 hours, is preferably 10% or less, more preferably 8% or less, and even more preferably 6% or less. When the heat shrinkage is 10% or less, short circuits of the electrodes are less likely to occur since a separator terminal is shrunk when heat is generated in the case where the multilayer, microporous polyolefin membrane is used as the separator for a lithium battery.

The heat shrinkage is a value determined by measuring a shrinkage in the MD direction and the TD direction after exposing the microporous membrane at 105° C. for 8 hours three times each and calculating its average value. The heat shrinkage is expressed by the following formula.

Heat shrinkage (%)=100×(length before the heating−length after the heating)/length before the heating (8) Shutdown Temperature The shutdown temperature of the multilayer, microporous polyolefin membrane of the present invention is preferably 137° C. or lower, and more preferably 135° C. or lower. Note that the shutdown temperature is measured by a method disclosed in WO2007/052663. According to this method, the multilayer, microporous polyolefin membrane is exposed to an atmosphere at 30° C., and then the temperature is raised at 5° C./min while the air permeability of the membrane is measured. The shutdown temperature of the multilayer, microporous polyolefin membrane is defined as a temperature at which the air permeability (Gurley value) of the multilayer, microporous polyolefin membrane exceeds 100,000 sec/100 cm$^3$ for the first time. The air permeability of the multilayer, microporous polyolefin membrane is measured in accordance with JIS P 8117 using an air permeability tester (EGO-1T, manufactured by Asahi Seiko Co., Ltd.).

(9) Electrolyte Injection Performance

The electrolyte injection performance of the multilayer, microporous polyolefin membrane of the present invention is 20 seconds or less. The electrolyte injection performance is evaluated by the permeation time of polypropylene carbonate. A 50 mm×50 mm sample is placed on a glass plate, from about 2 cm above the sample, 0.5 mL of propylene carbonate is dropped, and measurement of time is started after completion of the dropping. After completion of the dropping, the propylene carbonate forms a droplet on the membrane due to surface tension; however, the dropped propylene carbonate permeates into the membrane as time passes. When all the propylene carbonate on the membrane has penetrated therethrough, the measurement of time is stopped to determine the permeation time. The permeation time of 20 seconds or shorter is evaluated as "good", longer than 20 seconds but 50 seconds or shorter is evaluated as "fair", and longer than 50 seconds is evaluated as "poor".

(10) Average Electrochemical Stability (Leakage Current Value) (mAh)

To measure the electrochemical stability, a membrane having a length (MD) of 70 mm and a width (TD) of 60 mm is arranged in between a negative electrode and a positive electrode having the same area as that of the membrane. The negative electrode is made of natural graphite, and the positive electrode is made of LiCoO$_2$. The electrolyte is prepared by dissolving 1M solution of LiPF$_6$ into a mixture of ethylene carbonate (EC) and dimethyl carbonate (DMC) (3/7, V/V). A battery is completed by impregnating the membrane arranged in the region between the negative electrode and the positive electrode with the electrolyte.

Thereafter, while the battery is exposed to a temperature of 60° C. for 28 days, the battery is exposed to an applied voltage of 4.3 V. The term "electrochemical stability" is defined as an integrated current (mAh) flowing between the voltage source and the battery over the 28-day period. Electrochemical stability is measured for three batteries in substantially identical conditions (three substantially identical batteries are produced from three substantially identical membrane samples). The average (arithmetic mean) of the measured electrochemical stability values of the three batteries is the "average electrochemical stability (leakage current value)".

The electrochemical stability is the membrane characteristics that are related to oxidation resistance of the membrane in the case where the membrane is used as a separator in the battery exposed to a relatively high temperature during storage or use. The unit of the electrochemical stability is mAh and, typically, lower values are more desirable (indicating that total loss in charging during storage at high temperatures or during overcharging is smaller). Since automotive batteries, such as those used for starting or supplying electricity to power means for driving an electric vehicle or hybrid electric vehicle, and power tool batteries are used for purposes requiring relatively high output power and large capacity, even a little loss in battery capacity, such as self-discharging loss due to electrochemical instability of a separator for batteries, is a huge problem. The average electrochemical stability of the multilayer, microporous polyolefin membrane of the present invention is preferably 45.0 mAh or less, and particularly preferably 35.0 mAh or less. The term "large capacity" battery typically refers to a battery that can supply 1 ampere-hour (1 Ah) or greater, such as from 2.0 Ah to 3.6 Ah.

(11) Rate of Leakage Current Increase (mA/h)

Figure 4:
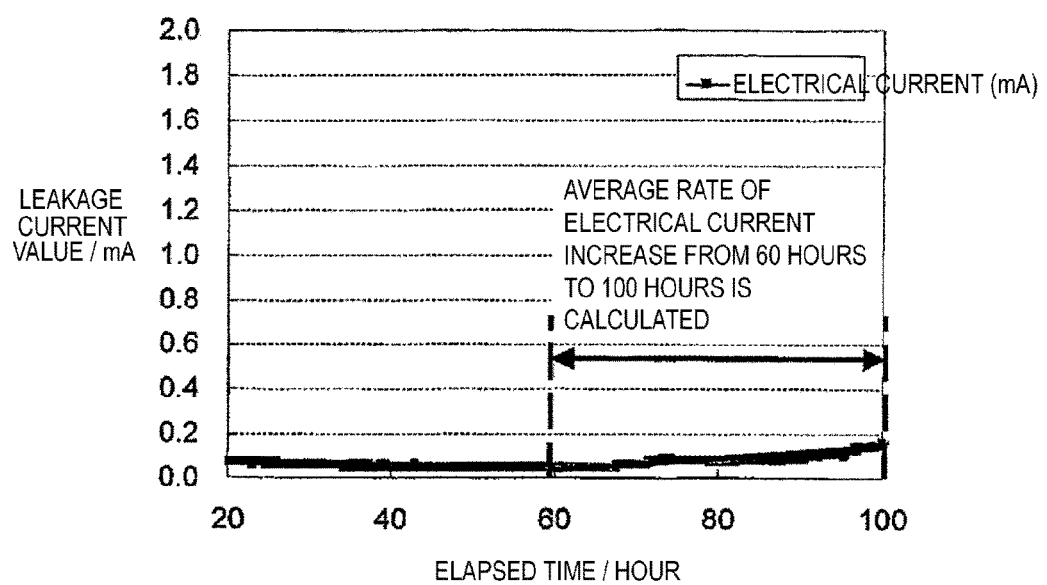
FIG. 4 is a schematic diagram describing the calculation method of an increasing rate of leakage current values of a multilayer, microporous polyolefin membrane (Working Example 2) of the present invention.

The rate of leakage current increase (mA/h) is defined as an increment of increase per 1 hour of electrical current value measured from 60 hours to 100 hours after the start of the experiment in the electrochemical stability measurement described above. To explain the calculation method, a graph showing the relationship between the leakage current value and the elapsed time in the multilayer microporous membrane of Working Example 3, as an example, is shown in FIG. 4. The rate of leakage current increase is a value obtained by subtracting the leakage current value at 60 hours after the start of the experiment from the leakage current value at 100 hours after the start of the experiment, and then dividing the obtained value by 40. The rate of leakage current increase indicates the degree of decrease in battery capacity for the case where charging is continued even after the battery is fully charged. This indicates increase in self-discharging due to deterioration of the battery, and smaller values indicates less deterioration in battery performance. The rate of leakage current increase is preferably $22 \times 10^{-3}$ mA/h or less, and more preferably $7 \times 10^{-3}$ mA/h or less.

(12) Membrane Thickness

The membrane thickness of the multilayer, microporous polyolefin membrane of the present invention is, for example when used as a separator for batteries, preferably from 5 to 50 µm, more preferably from 5 to 35 µm, and even more preferably from 10 to 25 µm. The membrane thickness may be measured by a contact thickness measurement method or a non-contact thickness measurement method. For example, the membrane thickness can be determined by measuring for a width of 10.0 cm at 1.0 cm intervals in the length direction using a contact thickness meter, and then calculating the average value thereof. Contact thickness meters such as Litematic, manufactured by Mitsutoyo Corporation, are suitable.

(13) Appearance

The appearance of the membrane was evaluated by visual observation/multipoint thickness measurement. Appearance with small changes in thickness that are observed visually is evaluated as "good". "Good" corresponds to the case where the changes in membrane thickness are less than 5 micron in the multipoint thickness measurement.

(14) Melting Point

The melting point of a resin is measured by the following procedure in accordance with JIS K 7122. That is, a resin sample is allowed to stand still in a sample holder of a differential scanning calorimeter (DSC-System 7, manufactured by Perkin Elmer Inc.), and in an nitrogen atmosphere, the resin sample is subjected to heat treatment at 230° C. for 10 minutes, cooled to 40° C. at 10° C./min, maintained at 40° C. for 2 minutes, and then heated to 230° C. at a rate of 10° C./min. The temperature at maximum heat absorption (peak temperature) is used as the melting point.

[4] Battery and the Like

As described above, the multilayer, microporous polyolefin membrane of the present invention has excellent oxidation resistance and electrolyte injection performance, is less likely to be blackened or the like even after charging and discharging are repeated as a battery, has excellent permeability and strength balance, and thus is particularly suitable as a separator for batteries.

The separator formed from the multilayer, microporous polyolefin membrane of the present invention can be used in batteries and in electric double-layer capacitors. Types of batteries/capacitors that use this are not particularly limited; however, the separator is particularly suitable for lithium secondary batteries/lithium ion capacitors. Lithium ion secondary batteries/capacitors that use the separator formed from the multilayer, microporous polyolefin membrane of the present invention can use publicly known electrodes and electrolytic solutions. Furthermore, structures of lithium ion secondary batteries/capacitors that use the separator formed from the multilayer, microporous polyolefin membrane of the present invention can be publicly known structures.

EXAMPLES

The present invention will be further described in detail using examples below; however, the present invention is not limited to these examples. Note that the physical properties of the multilayer, microporous polyolefin membrane are determined by the methods described above.

Working Example 1

(1) Preparation of First Polyolefin Solution

A first polyolefin composition containing, relative to the total weight of the first polyolefin composition, (a) 25% by weight of UHMwPE (Mw/Mn: 8.0) having an Mw of $2.0 \times 10^6$, (b) 72% by weight of HDPE (Mw/Mn: 8.6) having an Mw of $2.5 \times 10^5$, and (c) 3% by weight of polypropylene (Mw/Mn: 2.6; melting point: 155° C.) having an Mw of $9.7 \times 10^4$ was prepared by dry-blending. Per 100 parts by weight of the first polyolefin composition, 0.2 parts by weight of tetrakis[methylene-3-(3,5-ditertiary butyl-4-hydroxyphenyl)-propionate]methane as an antioxidant was dry-blended to prepare a first polyolefin resin.

To a strong kneading type twin-screw extruder, 20 parts by weight of the first polyolefin resin was supplied, and 80 parts by weight of liquid paraffin (50 cSt at 40° C.) was supplied to the twin-screw extruder via a side feeder. Melt-kneading was performed at 200 rpm at 210° C. to prepare a first polyolefin solution.

(2) Preparation of Second Polyolefin Solution

The second polyolefin solution was prepared in the same manner as in the preparation method of the first polyolefin solution except for the following. A second polyolefin composition containing, relative to the total weight of the second polyolefin composition, (a) 30% by weight of UHMwPE (Mw/Mn: 8.0) having an Mw of $2.0 \times 10^6$, and (b) 70% by weight of HDPE (Mw/Mn: 8.6; concentration of terminal vinyl groups: 0.1 groups/10000 carbons) having an Mw of $2.5 \times 10^5$ was prepared by dry-blending. Per 100 parts by weight of the second polyolefin composition, 0.2 parts by weight of tetrakis[methylene-3-(3,5-ditertiary butyl-4-hydroxyphenyl)-propionate]methane as an antioxidant was dry-blended to prepare a second polyolefin resin. To a strong kneading type twin-screw extruder, 28.5 parts by weight of the obtained second polyolefin composition was supplied, and 71.5 parts by weight of liquid paraffin (50 cSt at 40° C.) was supplied to the twin-screw extruder via a side feeder. Melt-kneading was performed at 200 rpm at 210° C. to prepare a second polyolefin solution.

(3) Production of Microporous Membrane

From twin-screw extruders, the first and second polyolefin solutions were separately fed to a three-layer T die, and a three-layer extrudate having a layer structure of the first polyolefin solution/the second polyolefin solution/the first polyolefin solution and a thickness ratio of the layers of 15/70/15 was formed. This extrudate was cooled by passing the extrudate through a cooling roll that was adjusted to 20° C., to form a three-layer gel-like laminated sheet. Note that the shear rate for the extrudate in the die was 190/sec and the cooling rate by the cooling roll was 32° C./sec. The obtained gel-like laminated sheet was subjected to simultaneous biaxial stretching where the stretching ratio was 5×5 magnification and the temperature was at 117° C. using a tenter type stretching machine (first stretching) and then wound. Thereafter, from the wound stretched body, a part thereof was collected and fixed to a frame [size: 20 cm×20 cm; made of aluminum (hereinafter the same)], soaked in a washing bath of methylene chloride in which temperature was adjusted to 25° C., and washed for 3 minutes while being agitated at 100 rpm. The washed membrane was air dried at room temperature. The dried microporous membrane was subjected to the second stretching where the stretching ratio was 1.5 magnification in the TD direction at 128° C. using a batch type stretching machine (restretching). Thereafter, the dried microporous membrane was subjected to thermal relaxation treatment at the same temperature and at the stretching ratio of 1.3 magnification in the TD direction. Then, the microporous membrane was subjected to heat setting treatment for 10 minutes at the temperature of the restretching while the microporous membrane was being fixed to the batch type stretching machine, to produce a multilayer, microporous polyolefin membrane.

Working Examples 2 to 8 and Comparative Examples 1 to 6 Multilayer, microporous polyolefin membranes were produced in the same manner as in Working Example 1 using raw materials and conditions that are described in Table 1 and Table 2. Note that "-" in Working Example 7 and Comparative Example 2 of Table 1 and Table 2 indicates that no thermal relaxation treatment was performed. Furthermore, "-" in Comparative Examples 1 to 4 in Table 2 indicates that the PP or PE described in the table was not contained.

TABLE 1

| | | Working Example 1 | Working Example 2 | Working Example 3 | Working Example 4 | Working Example 5 | Working Example 6 | Working Example 7 | Working Example 8 |
|---|---|---|---|---|---|---|---|---|---|
| Surface (skin) layer polyolefin resin composition | | | | | | | | | |
| UHMwPE | Molecular weight (Mw) | $2.0 \times 10^6$ | $2.0 \times 10^6$ | $2.0 \times 10^6$ | $2.0 \times 10^6$ | $2.0 \times 10^6$ | $2.0 \times 10^6$ | $2.0 \times 10^6$ | $2.0 \times 10^6$ |
| | Mw/Mn | 8 | 8 | 8 | 8 | 8 | 8 | 8 | 8 |
| | Content (wt %) | 25 | 10 | 30 | 40 | 40 | 30 | 40 | 20 |
| | Melting point (° C.) | 136 | 136 | 136 | 136 | 136 | 136 | 136 | 136 |
| HDPE | Molecular weight (Mw) | $2.5 \times 10^5$ | $2.5 \times 10^5$ | $2.5 \times 10^5$ | $2.5 \times 10^5$ | $2.5 \times 10^5$ | $2.5 \times 10^5$ | $2.5 \times 10^5$ | $2.5 \times 10^5$ |
| | Mw/Mn | 8.6 | 8.6 | 8.6 | 8.6 | 8.6 | 8.6 | 8.6 | 8.6 |
| | Content (wt %) | 72 | 87 | 67 | 59.5 | 55.1 | 67 | 57 | 77 |
| | Melting point (° C.) | 134 | 134 | 134 | 134 | 134 | 134 | 134 | 134 |
| PP | Molecular weight (Mw) | $9.7 \times 10^4$ | $9.7 \times 10^4$ | $9.7 \times 10^4$ | $9.7 \times 10^4$ | $9.7 \times 10^4$ | $9.7 \times 10^4$ | $2.7 \times 10^5$ | $9.7 \times 10^4$ |
| | Mw/Mn | 2.6 | 2.6 | 2.6 | 2.6 | 2.6 | 2.6 | 4.4 | 2.6 |
| | Content (wt %) | 3 | 3 | 3 | 0.5 | 4.9 | 3 | 3 | 3 |
| | Melting point (° C.) | 155 | 155 | 155 | 155 | 155 | 155 | 161 | 155 |
| Resin concentration of melt-kneaded material used for surface layer (wt %) | | 20 | 32 | 28.5 | 25 | 25 | 29 | 25 | 25 |
| Middle (core) layer polyolefin resin composition | | | | | | | | | |
| UHMwPE | Molecular weight (Mw) | $2.0 \times 10^6$ | $2.0 \times 10^6$ | $2.0 \times 10^6$ | $2.0 \times 10^6$ | $2.0 \times 10^6$ | $2.0 \times 10^6$ | $2.0 \times 10^6$ | $2.0 \times 10^6$ |
| | Mw/Mn | 8 | 8 | 8 | 8 | 8 | 8 | 8 | 8 |
| | Content (wt %) | 30 | 40 | 18 | 10 | 15 | 35 | 20 | 20 |
| | Melting point (° C.) | 136 | 136 | 136 | 136 | 136 | 136 | 136 | 136 |
| HDPE | Molecular weight (Mw) | $2.5 \times 10^5$ | $2.5 \times 10^5$ | $2.5 \times 10^5$ | $2.5 \times 10^5$ | $2.5 \times 10^5$ | $2.5 \times 10^5$ | $2.5 \times 10^5$ | $2.5 \times 10^5$ |
| | Mw/Mn | 8.6 | 8.6 | 8.6 | 8.6 | 8.6 | 8.6 | 8.6 | 8.6 |
| | Content (wt %) | 70 | 60 | 82 | 90 | 85 | 65 | 80 | 80 |
| | Melting point (° C.) | 134 | 134 | 134 | 134 | 134 | 134 | 134 | 134 |
| Resin concentration of melt-kneaded material used for middle layer (wt %) | | 28.5 | 25 | 25 | 27 | 30 | 25 | 30 | 25 |
| Thickness ratio of surface layer/middle layer | | 30/70 | 30/70 | 30/70 | 20/80 | 15/85 | 10/90 | 20/80 | 70/30 |
| Production conditions | | | | | | | | | |
| | Shear rate (/sec) | 190 | 195 | 220 | 200 | 210 | 205 | 180 | 200 |
| | Cooling rate (° C./sec) | 32 | 35.1 | 39 | 35 | 37 | 36 | 34 | 45 |
| First stretching | Temperature (° C.) | 117 | 118 | 115.5 | 116 | 115 | 116 | 114 | 115 |
| | Ratio (MD × TD) | 5 × 5 | 5 × 5 | 5 × 5 | 5 × 5 | 5 × 5 | 5 × 5 | 5 × 5 | 5 × 5 |
| Second stretching | Temperature (° C.) | 128 | 128 | 126 | 128 | 129 | 126 | 128.5 | 127 |
| | Ratio (TD) | 1.5 | 1.5 | 1.3 | 1.5 | 1.3 | 1.3 | 1.5 | 1.4 |
| Relaxation treatment after second stretching | Temperature (° C.) | 128 | 128 | 126 | 128 | 129 | 126 | — | 127 |
| | Ratio (TD) | 1.3 | 1.3 | 1.2 | 1.4 | 1.2 | 1.1 | — | 1.2 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Surface (skin) layer polyolefin resin composition | | | | | | | |
| UHMwPE | Molecular weight (Mw) | $2.0 \times 10^6$ | — | — | — | $2.0 \times 10^6$ | $2.0 \times 10^6$ |
| | Mw/Mn | 8 | — | — | — | 8 | 8 |
| | Content (wt %) | 25 | — | — | — | 20 | 20 |
| | Melting point (° C.) | 136 | — | — | — | 136 | 136 |
| HDPE | Molecular weight (Mw) | $2.5 \times 10^5$ | $2.5 \times 10^5$ | $2.5 \times 10^5$ | $2.5 \times 10^5$ | $2.5 \times 10^5$ | $2.5 \times 10^5$ |
| | Mw/Mn | 8.6 | 8.6 | 8.6 | 8.6 | 8.6 | 8.6 |
| | Content (wt %) | 75 | 97 | 92 | 99.7 | 77 | 77 |
| | Melting point (° C.) | 134 | 134 | 134 | 134 | 134 | 134 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| PP | Molecular weight (Mw) | — | $4.9 \times 10^5$ | $9.7 \times 10^4$ | $9.7 \times 10^4$ | $9.7 \times 10^4$ | $9.7 \times 10^4$ |
|  | Mw/Mn | — | 10.6 | 2.6 | 2.6 | 2.6 | 2.6 |
|  | Content (wt %) | — | 3 | 8 | 0.3 | 3 | 3 |
|  | Melting point (° C.) | — | 162 | 155 | 155 | 155 | 155 |
| Resin concentration of melt-kneaded material used for surface layer (wt %) |  | 20 | 30 | 30 | 30 | 25 | 25 |
| Middle (core) layer polyolefin resin composition |  |  |  |  |  |  |  |
| UHMwPE | Molecular weight (Mw) | $2.0 \times 10^6$ | $2.0 \times 10^6$ | $2.0 \times 10^6$ | $2.0 \times 10^6$ | $2.0 \times 10^6$ | $2.0 \times 10^6$ |
|  | Mw/Mn | 8 | 8 | 8 | 8 | 8 | 8 |
|  | Content (wt %) | 30 | 20 | 30 | 30 | 20 | 20 |
|  | Melting point (° C.) | 136 | 136 | 136 | 136 | 136 | 136 |
| HDPE | Molecular weight (Mw) | $2.5 \times 10^5$ | $2.5 \times 10^5$ | $2.5 \times 10^5$ | $2.5 \times 10^5$ | $2.5 \times 10^5$ | $2.5 \times 10^5$ |
|  | Mw/Mn | 8.6 | 8.6 | 8.6 | 8.6 | 8.6 | 8.6 |
|  | Content (wt %) | 70 | 80 | 70 | 70 | 80 | 80 |
|  | Melting point (° C.) | 134 | 134 | 134 | 134 | 134 | 134 |
| Resin concentration of melt-kneaded material used for middle layer (wt %) |  | 28.5 | 25 | 25 | 25 | 25 | 25 |
| Thickness ratio of surface layer/middle layer |  | 30/70 | 15/85 | 15/85 | 15/85 | 70/30 | 70/30 |
| Production conditions |  |  |  |  |  |  |  |
|  | Shear rate (/sec) | 195 | 193 | 182 | 169 | 50 | 210 |
|  | Cooling rate (° C./sec) | 35 | 35.1 | 33.4 | 30.7 | 30.1 | 26 |
| First stretching | Temperature (° C.) | 117 | 117 | 115 | 115 | 115 | 115 |
|  | Ratio (MD × TD) | 5 × 5 | 5 × 5 | 5 × 5 | 5 × 5 | 5 × 5 | 5 × 5 |
| Second stretching | Temperature (° C.) | 128 | 126 | 124 | 124 | 127 | 127 |
|  | Ratio (TD) | 1.5 | 1.4 | 1.4 | 1.4 | 1.4 | 1.4 |
| Relaxation treatment after second stretching | Temperature (° C.) | 128 | — | 124 | 124 | 127 | 127 |
|  | Ratio (TD) | 1.3 | — | 1.2 | 1.2 | 1.2 | 1.2 |

In Table 3 and Table 4, physical properties of the microporous polyolefin membranes of Working Examples 1 to 8 and Comparative Examples 1 to 6 are shown. Note that "-" in Comparative Example 1 of Table 4 indicates that measurement was not possible since no PP was contained. In Comparative Example 4, "-" indicates that measurement was not possible since the surface had a large unevenness that can be observed visually.

TABLE 3

|  | Working Example 1 | Working Example 2 | Working Example 3 | Working Example 4 | Working Example 5 | Working Example 6 | Working Example 7 | Working Example 8 |
|---|---|---|---|---|---|---|---|---|
| Physical properties of microporous membrane |  |  |  |  |  |  |  |  |
| Membrane thickness (μm) | 20 | 20 | 20 | 18 | 20 | 20 | 16 | 20 |
| Air permeability (sec/100 cm³/20 μm) | 245 | 240 | 245 | 135 | 235 | 285 | 200 | 270 |
| Porosity (%) | 43 | 43 | 45.2 | 47.1 | 42 | 42.6 | 48 | 42.1 |
| Pin puncture strength (mN/20 μm) | 4905 | 4950 | 4805 | 4415 | 5150 | 4900 | 5640 | 4460 |
| Tensile strength at break MD (kPa) | 114740 | 116700 | 112290 | 86800 | 126015 | 134350 | 119640 | 120130 |
| Tensile strength at break TD (kPa) | 133370 | 133370 | 116700 | 124550 | 142200 | 122590 | 171615 | 111800 |
| Tensile elongation at break MD (%) | 150 | 160 | 160 | 150 | 180 | 180 | 180 | 165 |
| Tensile elongation at break TD (%) | 160 | 165 | 170 | 175 | 190 | 175 | 210 | 155 |
| Heat shrinkage rate MD (%) | 2.4 | 2.9 | 4.8 | 2.7 | 2.5 | 5.6 | 4.2 | 4.6 |
| Heat shrinkage rate TD (%) | 1.0 | 1.2 | 3.6 | 3 | 2.3 | 1.8 | 5.9 | 1.2 |
| Shutdown temperature (° C.) | 135 | 135 | 134 | 134 | 135 | 134 | 136 | 135 |
| Pin puncture strength of surface layer (mN/20 μm) | 3972 | 4462 | 5590 | 5492 | 5835 | 5149 | 5982 | 4750 |
| Porosity of surface layer (%) | 45 | 43 | 44 | 46.4 | 41.5 | 41.8 | 47.8 | 43 |
| Electrolyte injection performance | 3.9 | 4.1 | 3.8 | 2.5 | 7.7 | 4.5 | 9.1 | 3.5 |
| Normalized PP/PE ratio average value | 0.63 | 0.66 | 0.69 | 0.69 | 0.71 | 0.68 | 0.63 | 0.68 |
| Normalized PP/PE ratio standard deviation | 0.11 | 0.1 | 0.09 | 0.1 | 0.09 | 0.1 | 0.11 | 0.1 |
| Normalized PP/PE ratio kurtosis | 0.8 | 0.4 | 0.21 | 0.3 | 0.2 | 0.3 | 0.76 | 0.8 |
| Average electrochemical stability (mAh) | 41 | 38 | 21 | 24 | 22 | 23 | 29 | 35 |
| Rate of leakage current increase (×$10^{-3}$ mA/h) | 21.8 | 16.4 | 3.4 | 6.6 | 4.3 | 7.4 | 8.9 | 13.6 |
| Appearance | Good | Good | Good | Good | Good | Good | Good | Good |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Physical properties of microporous membrane |  |  |  |  |  |  |
| Membrane thickness (μm) | 20 | 12 | 13 | 12 | 20 | 21 |
| Air permeability (sec/100 cm$^3$/20 μm) | 250 | 115 | 85 | 100 | 280 | 250 |
| Porosity (%) | 43 | 49.9 | 54.2 | 48.9 | 42.6 | 46.1 |
| Pin puncture strength (mN/20 μm) | 5001 | 2490 | 2330 | 2460 | 5070 | 4810 |
| Tensile strength at break MD (kPa) | 117680 | 77000 | 71590 | 81100 | 122100 | 115820 |
| Tensile strength at break TD (kPa) | 134351 | 102600 | 88750 | 100715 | 128660 | 122000 |
| Tensile elongation at break MD (%) | 160 | 115 | 90 | 125 | 167 | 171 |
| Tensile elongation at break TD (%) | 165 | 120 | 105 | 130 | 153 | 149 |
| Heat shrinkage MD (%) | 2.6 | 2.7 | 6.1 | 5.8 | 4.9 | 4.4 |
| Heat shrinkage TD (%) | 1.3 | 2.4 | 3.4 | 3 | 1.5 | 1.1 |
| Shutdown temperature (° C.) | 135 | 132 | 133 | 134 | 135 | 134 |
| Pin puncture strength of surface layer (mN/20 μm) | 3972 | 3825 | 4900 | 4910 | 4750 | 4413 |
| Porosity of surface layer (%) | 45 | 50 | 48 | 48 | 43 | 43 |
| Electrolyte injection performance | 1.9 | >50 | — | 2.4 | 23.4 | 21.8 |
| Normalized PP/PE ratio average value | — | 0.61 | — | 0.46 | 0.51 | 0.58 |
| Normalized PP/PE ratio standard deviation | — | 0.10 | — | 0.1 | 0.11 | 0.15 |
| Normalized PP/PE ratio kurtosis | — | 0.62 | — | 0.4 | 0.9 | 1 |
| Average electrochemical stability (mAh) | 78 | 710 | — | 51 | 67 | 82 |
| Rate of leakage current increase (×10$^{-3}$ mA/h) | 24.2 | 84.8 | — | 24.1 | 27.5 | 22.6 |
| Appearance | Good | Good | Unevenness on surface | Good | Good | Good |

Figure 2:
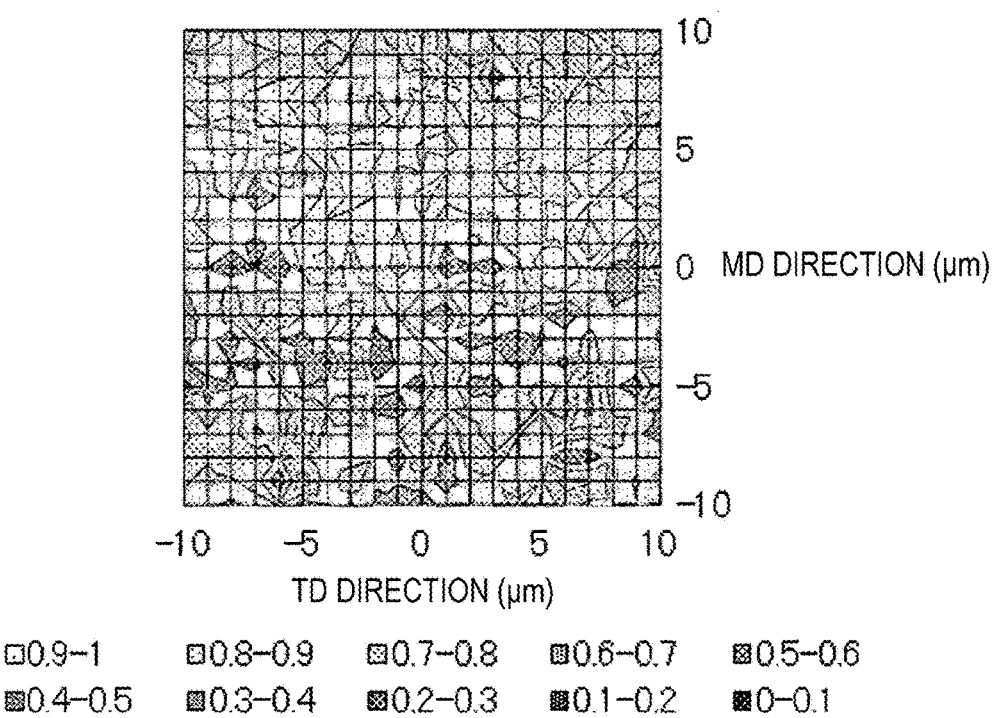
FIG. 2 is a two-dimensional distribution diagram of normalized PP/PE ratio of a first microporous layer of a multilayer, microporous polyolefin membrane (Working Example 3) of the present invention.
Figure 3:
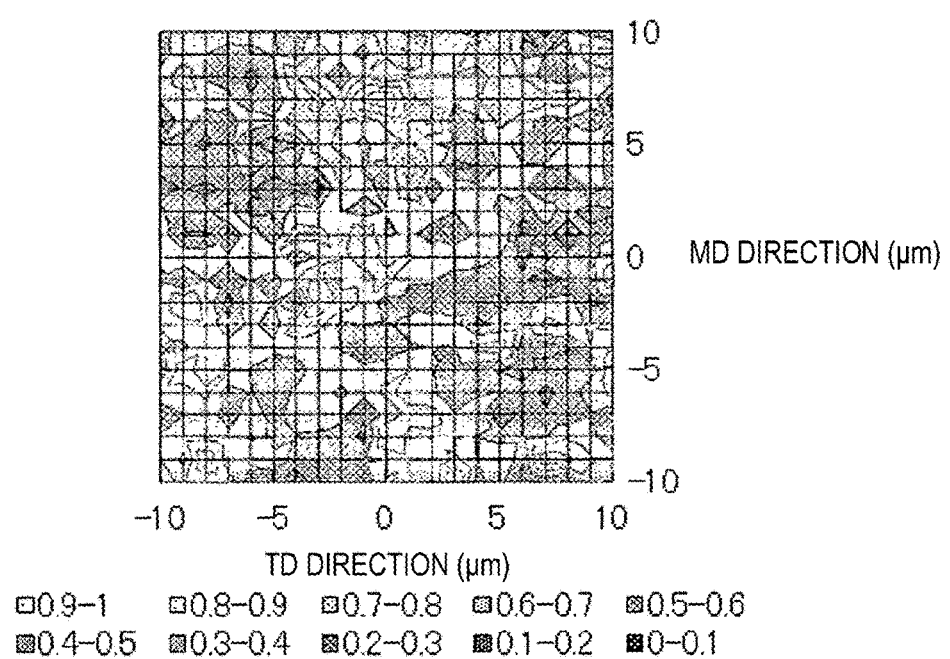
FIG. 3 is a two-dimensional distribution diagram of normalized PP/PE ratio of a first microporous layer of a multilayer, microporous polyolefin membrane (Comparative Example 2).

From Table 3 and Table 4, all of the microporous polyolefin membranes of Working Examples 1 to 8 have excellent electrolyte injection performance and uniform PP distribution. Furthermore, the leakage current values are 45 mAh or less and indicate excellent oxidation resistances. FIG. 1 is a graph illustrating a distribution of the normalized PP/PE ratio on the surface layer of the multilayer, microporous polyolefin membrane of Working Example 3. As is clear from FIG. 1, values of the normalized PP/PE ratio are concentrated in a narrow range located in equal to and greater than 0.5. FIG. 2 illustrates a two-dimensional distribution of the normalized PP/PE ratio on the surface layer of the multilayer, microporous polyolefin membrane of Working Example 3. As is clear from FIG. 2, almost no low polypropylene concentration regions (regions with dark color) are observed, and polypropylene are evenly present. On the other hand, FIG. 3 illustrates a two-dimensional distribution of the normalized PP/PE ratio on the surface layer of the multilayer, microporous polyolefin membrane of Comparative Example 2. As is clear from FIG. 3, many low polypropylene concentration regions (regions with dark color) are observed, and polypropylene is not evenly present on the surface layer.

Furthermore, the multilayer, microporous polyolefin membranes of Working Examples 1 to 7 have excellent electrolyte injection performance, excellent permeability and strength balance, and excellent tensile elongation at break and heat shrinkage resistance. Furthermore, since the membrane thicknesses are uniform, oxidation reactions of separators caused in batteries are more suppressed. Particularly in the multilayer, microporous polyolefin membranes of Working Examples 3 to 7, the pin puncture strength on the surface layer is 4500 mN/20 μm or greater but 7000 mN or less, the porosity is from 40% to 50%, more excellent permeability and oxidation resistance are achieved, and deterioration of battery performance is suppressed. Furthermore, in the multilayer, microporous polyolefin membranes of Working Examples 3 to 5, the pin puncture strength in terms of 20 μm thickness of the surface layer (Punc$_1$) and the porosity (Po$_1$) satisfy the relationship of Formula (A), and deterioration of oxidation resistance and battery performance are more suppressed.

$$110 \leq Po_1 + 0.01275 \times Punc_1 \leq 122 \quad \text{Formula (A)}$$

On the other hand, since the multilayer, microporous polyolefin membrane of Comparative Example 1 contains no polypropylene, and since the multilayer, microporous polyolefin membrane of Comparative Example 2 contains polypropylene having a weight average molecular weight of 3.0×10$^5$ or greater, balance of physical properties is poor, e.g. as permeability and oxidation resistance deteriorate, deterioration of the battery progresses.

The multilayer, microporous polyolefin membrane of Comparative Example 3 contains 8% by weight of polypropylene that is the same polypropylene as those used in Working Examples 1 to 6 and 8. Although the porosity increases and air permeability decreases, strength has decreased. Regarding the appearance of the membrane, unevenness can be visually observed, and it was confirmed that general physical properties as a separator for batteries were poor.

The multilayer, microporous polyolefin membrane of Comparative Example 4 contains 0.3% by weight of polypropylene that is the same polypropylene as those used in Working Examples 1 to 6 and 8. Although the dispersibility (standard deviation and kurtosis) of the polypropylene was good, it is conceived that the polypropylene concentration around the surface became insufficient and oxidation resistance was not enhanced.

Comparative Example 5 used the same resin composition as that of Working Example 8 but used a lower shear rate from the T die. As a result, permeability was deteriorated, and lowering of electrolyte injection performance and deterioration of oxidation resistance were observed.

Comparative Example 6 used the same resin composition as that of Working Example 8 but used a lower cooling rate. As a result, permeability was deteriorated, and lowering of electrolyte injection performance and deterioration of oxidation resistance were observed.

INDUSTRIAL APPLICABILITY

The present invention provides a microporous polyolefin membrane which has excellent oxidation resistance and electrolyte injection performance and further has excellent permeability and strength balance.

The multilayer, microporous polyolefin membrane of the present invention has characteristics that is suitable as a power storage device with nonaqueous electrolyte for use in capacitors, batteries, and the like, and can contribute to enhancement of safety and reliability. The multilayer, microporous polyolefin membrane of the present invention can be suitably used as, among those described above, a separator for batteries, more specifically a separator for lithium ion batteries. The multilayer, microporous polyolefin membrane of the present invention can be also used in other purposes, including a component for fuel cells, various separation membranes such as humidifying membranes and filtration membranes, and thus is also industrially applicable in these fields.

The invention claimed is:

1. A multilayer, microporous polyolefin membrane, comprising:
a first surface layer comprising a first microporous layer containing polypropylene, wherein a polypropylene distribution in the first microporous layer is substantially uniform along an in-plane direction,
wherein an electrolyte injection performance of the multilayer, microporous polyolefin membrane is 20 seconds or less, and wherein air permeability normalized for the membrane thickness of the membrane of 20 μm is 20 sec/cm³/20 μm or greater, and wherein air permeability of the membrane is 285 sec/100 cm³ or less,
wherein a pin puncture strength ($Punc_1$) of the first microporous layer is between 4500 mN/20 μm and 7000 mN/20 μm, and a porosity ($Po_1$) of the first microporous layer is between 40% and 50%,
wherein the pin puncture strength ($Punc_1$) of the first microporous layer and the porosity ($Po_1$) of the first microporous layer satisfy a relationship described in Formula (A) below:

$$110 \leq Po_1 + 0.01275 \times Punc_1 \leq 122 \quad \text{Formula (A), and}$$

wherein, $Po_1$ is the porosity (%) of the first microporous layer, and $Punc_1$ is the pin puncture strength (mN/20 μm) normalized for the membrane thickness of the first microporous layer of 20 μm.

2. The multilayer, microporous polyolefin membrane according to claim 1, wherein the first surface layer further comprises polyethylene, and wherein a normalized polypropylene/polyethylene ratio in the first microporous layer determined by Raman spectroscopy has an average value of 0.5 or greater, a standard deviation of 0.2 or less, and kurtosis between −1.0 and 1.0.

3. The multilayer, microporous polyolefin membrane according to claim 1, wherein the polypropylene has an average molecular weight greater than $6.0 \times 10^4$ and less than $3.0 \times 10^5$, and wherein the first microporous layer contains at least 0.5% polypropylene by weight and contains less than 5.0% polypropylene by weight.

4. The multilayer, microporous polyolefin membrane according to claim 1, wherein the first microporous layer comprises a first polyolefin resin, and the first polyolefin resin comprises:
polyethylene having an average molecular weight of less than $1.0 \times 10^6$,
ultra high molecular weight polyethylene having an average molecular weight of $1.0 \times 10^6$ or greater, and
polypropylene having an average molecular weight of greater than $6.0 \times 10^4$ and less than $3.0 \times 10^5$.

5. The multilayer, microporous polyolefin membrane according to claim 4, wherein the first polyolefin resin comprises:
high density polyethylene having an average molecular weight of $5.0 \times 10^4$ or greater and less than $5.0 \times 10^5$, and a concentration between 45.0% by weight and 98.5% by weight,
ultra high molecular weight polyethylene having an average molecular weight of at least $1.0 \times 10^6$ and less than $3.0 \times 10^6$, and a concentration between 1.0% by weight and 55.0% by weight, and
polypropylene having an average molecular weight of greater than $6.0 \times 10^4$ and less than $3.0 \times 10^5$, and a concentration of at least 0.5% by weight and less than 5.0% by weight.

6. The multilayer, microporous polyolefin membrane according to claim 1, comprising a second microporous layer formed from a second polyolefin resin, wherein the second microporous layer is arranged in between the first surface layer and a surface layer.

7. A multilayer, microporous polyolefin membrane, comprising:
a first surface layer comprising a first microporous layer containing polypropylene, wherein a polypropylene distribution in the first microporous layer is substantially uniform along a first in-plane direction,
wherein an electrolyte injection performance of the multilayer, microporous polyolefin membrane is 20 seconds or less, and wherein air permeability normalized for the membrane thickness of the membrane of 20 μm is 20 sec/100 cm³/20 μm or greater, and wherein air permeability of the membrane is 285 sec/100 cm³ or less; and
a second microporous layer formed from a second polyolefin resin,
wherein the multilayer, microporous polyolefin membrane has a three-layer structure in which the second microporous layer is arranged in between the first surface layer and a second surface layer, wherein the second surface layer comprises a third microporous layer containing polypropylene, wherein a polypropylene distribution in the third microporous layer is substantially uniform along a second in-plane direction.

8. The multilayer, microporous polyolefin membrane according to claim 7, wherein the first surface layer further comprises polyethylene, and wherein a normalized polypropylene/polyethylene ratio in the first microporous layer determined by Raman spectroscopy has an average value of 0.5 or greater, a standard deviation of 0.2 or less, and kurtosis between −1.0 and 1.0.

9. The multilayer, microporous polyolefin membrane according to claim 7, wherein the polypropylene has an average molecular weight greater than $6.0 \times 10^4$ and less than $3.0 \times 10^5$, and wherein the first microporous layer contains at least 0.5% polypropylene by weight and contains less than 5.0% polypropylene by weight.

10. The multilayer, microporous polyolefin membrane according to claim 7, wherein a pin puncture strength ($Punc_1$) of the first microporous layer is between 4500 mN/20 μm and 7000 mN/20 μm, and a porosity (Po1) of the first microporous layer is between 40% and 50%.

11. The multilayer, microporous polyolefin membrane according to claim 10, wherein the pin puncture strength ($Punc_1$) of the first microporous layer and the porosity ($Po_1$) of the first microporous layer satisfy a relationship described in Formula (A) below:

$$110 \leq Po_1 + 0.01275 \times Punc_1 \leq 122 \quad \text{Formula (A),}$$

wherein, $Po_1$ is the porosity (%) of the first microporous layer, and $Punc_1$ is the pin puncture strength (mN/20 μm) normalized for the membrane thickness of the first microporous layer of 20 μm.

12. The multilayer, microporous polyolefin membrane according to claim 7, wherein the first microporous layer comprises a first polyolefin resin, and the first polyolefin resin comprises:
   polyethylene having an average molecular weight of less than $1.0 \times 10^6$,
   ultra high molecular weight polyethylene having an average molecular weight of $1.0 \times 10^6$ or greater, and
   polypropylene having an average molecular weight of greater than $6.0 \times 10^4$ and less than $3.0 \times 10^5$.

13. The multilayer, microporous polyolefin membrane according to claim 12, wherein the first polyolefin resin comprises:
   high density polyethylene having an average molecular weight of $5.0 \times 10^4$ or greater and less than $5.0 \times 10^5$, and a concentration between 45.0% by weight and 98.5% by weight,
   ultra high molecular weight polyethylene having an average molecular weight of at least $1.0 \times 10^6$ and less than $3.0 \times 10^6$, and a concentration between 1.0% by weight and 55.0% by weight, and
   polypropylene having an average molecular weight of greater than $6.0 \times 10^4$ and less than $3.0 \times 10^5$, and a concentration of at least 0.5% by weight and less than 5.0% by weight.

14. The multilayer, microporous polyolefin membrane according to claim 7, wherein the second polyolefin resin comprises:
   high density polyethylene having an average molecular weight of at least $5.0 \times 10^4$ and less than $5.0 \times 10^5$, and a concentration of between 50.0% and 99.0% by weight of the second polyolefin resin, and
   ultra high molecular weight polyethylene having an average molecular weight of at least $1.0 \times 10^6$ and less than $3.0 \times 10^6$, and a concentration of between 1.0% and 50.0% by weight of the second polyolefin resin, and
   wherein the second polyolefin resin does not contain polypropylene.

15. The multilayer, microporous polyolefin membrane according to claim 14, wherein the second microporous layer is substantially uniform along an in-plane direction.

16. A multilayer, microporous polyolefin membrane, comprising:
   a first surface layer comprising a first microporous layer containing polypropylene, wherein a polypropylene distribution in the first microporous layer is substantially uniform along an in-plane direction,
   wherein an electrolyte injection performance of the multilayer, microporous polyolefin membrane is 20 seconds or less, and wherein air permeability normalized for the membrane thickness of the membrane of 20 μm is 20 sec/100 cm³/20 μm or greater, and wherein air permeability of the membrane is 285 sec/100 cm³ or less; and
   a second microporous layer formed from a second polyolefin resin, wherein the second microporous layer is arranged in between the first surface layer and a surface layer, and wherein the second polyolefin resin comprises:
      high density polyethylene having an average molecular weight of at least $5.0 \times 10^4$ and less than $5.0 \times 10^5$, and a concentration of between 50.0% and 99.0% by weight of the second polyolefin resin, and
      ultra high molecular weight polyethylene having an average molecular weight of at least $1.0 \times 10^6$ and less than $3.0 \times 10^6$, and a concentration of between 1.0% and 50.0% by weight of the second polyolefin resin, and
   wherein the second polyolefin resin does not contain polypropylene.

17. The multilayer, microporous polyolefin membrane according to claim 16, wherein the first surface layer further comprises polyethylene, and wherein a normalized polypropylene/polyethylene ratio in the first microporous layer determined by Raman spectroscopy has an average value of 0.5 or greater, a standard deviation of 0.2 or less, and kurtosis between −1.0 and 1.0.

18. The multilayer, microporous polyolefin membrane according to claim 16, wherein the polypropylene has an average molecular weight greater than $6.0 \times 10^4$ and less than $3.0 \times 10^5$, and wherein the first microporous layer contains at least 0.5% polypropylene by weight and contains less than 5.0% polypropylene by weight.

19. The multilayer, microporous polyolefin membrane according to claim 16, wherein a pin puncture strength ($Punc_1$) of the first microporous layer is between 4500 mN/20 μm and 7000 mN/20 μm, wherein a porosity ($Po1$) of the first microporous layer is between 40% and 50%, and wherein the pin puncture strength ($Punc_1$) of the first microporous layer and the porosity ($Po_1$) of the first microporous layer satisfy a relationship described in Formula (A) below:

$$110 \leq Po_1 + 0.01275 \times Punc_1 \leq 122 \quad \text{Formula (A)},$$

wherein, $Po_1$ is the porosity (%) of the first microporous layer, and $Punc_1$ is the pin puncture strength (mN/20 μm) normalized for the membrane thickness of the first microporous layer of 20 μm.

20. The multilayer, microporous polyolefin membrane according to claim 16, wherein the first microporous layer comprises a first polyolefin resin, and the first polyolefin resin comprises:
   polyethylene having an average molecular weight of less than $1.0 \times 10^6$,
   ultra high molecular weight polyethylene having an average molecular weight of $1.0 \times 10^6$ or greater, and
   polypropylene having an average molecular weight of greater than $6.0 \times 10^4$ and less than $3.0 \times 10^5$,
   wherein the first polyolefin resin comprises:
      high density polyethylene having an average molecular weight of $5.0 \times 10^4$ or greater and less than $5.0 \times 10^5$, and a concentration between 45.0% by weight and 98.5% by weight,
      ultra high molecular weight polyethylene having an average molecular weight of at least $1.0 \times 10^6$ and less than $3.0 \times 10^6$, and a concentration between 1.0% by weight and 55.0% by weight, and
      polypropylene having an average molecular weight of greater than $6.0 \times 10^4$ and less than $3.0 \times 10^5$, and a concentration of at least 0.5% by weight and less than 5.0% by weight.

21. The multilayer, microporous polyolefin membrane according to claim 16, wherein the multilayer, microporous polyolefin membrane has a three-layer structure in which the second microporous layer is arranged in between the first surface layer and a second surface layer, wherein the second surface layer comprises a second microporous layer containing polypropylene, wherein a polypropylene distribution in the second microporous layer is substantially uniform along an in-plane direction.

* * * * *